(12) United States Patent
Walton

(10) Patent No.: US 7,196,657 B2
(45) Date of Patent: Mar. 27, 2007

(54) RADAR SYSTEM USING RF NOISE

(75) Inventor: Eric K. Walton, Columbus, OH (US)

(73) Assignee: The Ohio State University, Columbus, OH (US)

( * ) Notice: Subject to any disclaimer, the term of this patent is extended or adjusted under 35 U.S.C. 154(b) by 108 days.

(21) Appl. No.: 11/076,424

(22) Filed: Mar. 8, 2005

(65) Prior Publication Data

US 2006/0012513 A1    Jan. 19, 2006

Related U.S. Application Data

(63) Continuation-in-part of application No. 10/355,627, filed on Jan. 31, 2003, now Pat. No. 6,864,834.

(51) Int. Cl.
*G01S 13/00* (2006.01)

(52) U.S. Cl. ............... 342/195; 342/175; 342/159

(58) Field of Classification Search .............. 342/195, 342/175, 159
See application file for complete search history.

(56) References Cited

U.S. PATENT DOCUMENTS

| | | | |
|---|---|---|---|
| 3,308,463 A | 3/1967 | Emerson | 343/18 |
| 3,854,137 A | 12/1974 | Kohler | 343/106 D |
| 3,900,879 A | 8/1975 | Lewinter | 343/113 R |
| 3,911,357 A | 10/1975 | Adam | 324/51 |
| 3,918,054 A | 11/1975 | Collins | 343/5 DP |
| 3,975,738 A | 8/1976 | Pelton et al. | 343/872 |
| 4,276,509 A | 6/1981 | Bryant et al. | 324/51 |
| 4,287,520 A | 9/1981 | Van Vliet et al. | 343/909 |
| 4,395,677 A | 7/1983 | Petersdorf | 324/117 H |
| 4,475,108 A | 10/1984 | Moser | 343/700 MS |
| 4,584,523 A | 4/1986 | Elabd | 324/96 |
| 4,673,944 A | 6/1987 | Graves | 342/424 |
| 4,712,057 A | 12/1987 | Pau | 324/73 R |
| 4,764,773 A | 8/1988 | Larsen et al. | 343/713 |
| 4,809,184 A * | 2/1989 | O'Donnell et al. | 600/437 |
| 4,813,198 A | 3/1989 | Johnston et al. | 52/171 |
| 5,012,255 A | 4/1991 | Becker | 343/704 |
| 5,014,346 A | 5/1991 | Phillips et al. | 455/89 |
| 5,039,949 A | 8/1991 | Hemming et al. | 324/646 |
| 5,089,700 A | 2/1992 | Sapia et al. | 250/330 |
| 5,138,330 A | 8/1992 | Lindenmeier et al. | 343/713 |

(Continued)

FOREIGN PATENT DOCUMENTS

GB    2309829 A    8/1997

(Continued)

OTHER PUBLICATIONS

Burnside, W.D. et al., "An Ultra-Wide Bandwidth, Tapered Chamber Feed", 1996 AMTA Symposium, Seattle, WA, Oct. 1996, pp. 103-108.

(Continued)

*Primary Examiner*—John B. Sotomayor
(74) *Attorney, Agent, or Firm*—Standley Law Group LLP

(57) ABSTRACT

A radar system that utilizes predetermined, pseudorandom, or random waveforms that may be substantially matched to the impulse response of the radar and any surrounding clutter such that the signal-to-clutter ratio may be optimized and/or such that specific targets may be identified and/or classified.

35 Claims, 15 Drawing Sheets

U.S. PATENT DOCUMENTS

| | | | |
|---|---|---|---|
| 5,139,850 A | 8/1992 | Clarke et al. | 428/192 |
| 5,147,694 A | 9/1992 | Clarke | 428/34 |
| 5,254,999 A * | 10/1993 | Lee | 342/197 |
| 5,266,960 A | 11/1993 | Lindenmeier et al. | 343/704 |
| 5,293,177 A | 3/1994 | Sakurai et al. | 343/906 |
| 5,337,016 A | 8/1994 | Wozniak et al. | 324/632 |
| 5,355,144 A | 10/1994 | Walton et al. | 343/713 |
| 5,410,621 A * | 4/1995 | Hyatt | 382/260 |
| 5,436,872 A | 7/1995 | Gilmour et al. | 367/103 |
| 5,459,760 A | 10/1995 | Watanabe | 375/202 |
| 5,577,269 A | 11/1996 | Ludewig | 455/90 |
| 5,620,799 A | 4/1997 | Sauer | 428/426 |
| 5,621,413 A | 4/1997 | Lempkowski et al. | 342/117 |
| 5,638,281 A | 6/1997 | Wang | 364/461 |
| 5,739,790 A | 4/1998 | Green, Jr. | 343/702 |
| 5,756,991 A | 5/1998 | Risinger et al. | 250/252.1 |
| 5,757,194 A | 5/1998 | Yun | 324/627 |
| 5,768,131 A | 6/1998 | Lissel et al. | 364/461 |
| 5,777,574 A * | 7/1998 | Robinson | 342/25 A |
| 5,812,098 A | 9/1998 | Harris et al. | 343/906 |
| 5,821,904 A | 10/1998 | Kakizawa et al. | 343/704 |
| 5,834,661 A | 11/1998 | Nonaka et al. | 73/866 |
| 5,853,889 A | 12/1998 | Joshi et al. | 428/411.1 |
| 5,864,319 A | 1/1999 | Paulus | 343/703 |
| 5,867,129 A | 2/1999 | Sauer | 343/713 |
| 5,874,917 A | 2/1999 | Desodt et al. | 342/379 |
| 5,917,458 A | 6/1999 | Ho et al. | 343/909 |
| 5,923,284 A | 7/1999 | Artis et al. | 342/129 |
| 5,945,957 A | 8/1999 | Kakizawa | 343/713 |
| 5,999,134 A | 12/1999 | Dishart et al. | 343/713 |
| 5,999,135 A | 12/1999 | Nozaki et al. | 343/713 |
| 6,002,357 A | 12/1999 | Redfern et al. | 342/22 |
| 6,081,237 A | 6/2000 | Sato et al. | 343/713 |
| 6,085,151 A | 7/2000 | Farmer et al. | 701/301 |
| 6,087,996 A | 7/2000 | Dery | 343/713 |
| RE36,819 E | 8/2000 | Gellner et al. | 342/70 |
| 6,198,427 B1 | 3/2001 | Aker et al. | 342/114 |
| 6,208,303 B1 | 3/2001 | Tachihara et al. | 343/704 |
| 6,211,812 B1 | 4/2001 | Chiles et al. | 342/145 |
| 6,229,493 B1 | 5/2001 | Iijima | 343/713 |
| 6,268,832 B1 | 7/2001 | Twort et al. | 343/713 |
| 6,292,129 B1 | 9/2001 | Matsugatani et al. | 342/70 |
| 6,320,558 B1 | 11/2001 | Walton | 343/906 |
| 6,356,236 B1 | 3/2002 | Maeuser et al. | 343/713 |
| 6,377,221 B1 | 4/2002 | Lindenmeier et al. | 343/713 |
| 6,437,748 B1 | 8/2002 | Burnside et al. | 343/703 |
| 6,452,560 B2 | 9/2002 | Kunysz | 343/770 |
| 6,483,468 B2 | 11/2002 | Walton | 343/713 |
| 6,551,715 B1 | 4/2003 | Seto et al. | 428/432 |
| 6,614,922 B1 | 9/2003 | Walton | 382/141 |
| 6,693,597 B2 | 2/2004 | Walton et al. | 343/713 |
| 6,864,834 B2 * | 3/2004 | Walton | 342/195 |
| 6,806,826 B2 | 10/2004 | Walton et al. | 342/194 |
| 6,860,081 B2 | 3/2005 | Walton et al. | 52/786.11 |
| 2001/0015698 A1 | 8/2001 | Tokoro | 342/70 |
| 2002/0122009 A1 | 9/2002 | Winebrand et al. | 343/767 |
| 2003/0011510 A1 | 1/2003 | Haruta et al. | 342/160 |
| 2003/0112190 A1 | 6/2003 | Baliarda et al. | 343/713 |
| 2004/0150555 A1* | 8/2004 | Walton | 342/195 |
| 2006/0012513 A1* | 1/2006 | Walton | 342/195 |

FOREIGN PATENT DOCUMENTS

| | | |
|---|---|---|
| RU | 2255351 C * | 6/2005 |
| WO | WO 03/027707 A2 | 4/2003 |
| WO | WO 03/073124 A1 | 9/2003 |
| WO | WO 03/092117 A2 | 11/2003 |
| WO | WO 2003/092117 A3 | 11/2003 |
| WO | WO 2004/051869 A2 | 6/2004 |
| WO | WO 2004/051869 A3 | 6/2004 |
| WO | WO 2004/051870 A2 | 6/2004 |
| WO | WO 2004/051870 A3 | 6/2004 |
| WO | WO 2005/003810 A1 | 1/2005 |

OTHER PUBLICATIONS

Gau, J-R. J., et al., "Chebyshev Multilevel Absorber Design Concept", IEEE Transactions on Antennas Propagation, vol. 45, No. 8, Aug. 1997, pp. 1286-1293.

Kim, M.W., et al, "Neural Network Based Optimum Radar Target Detection in Non-Gaussian Noise.", Proceedings of the International Joint Conference on Neural Networks, Jun. 7-11, 1992, pp. III-654-III-659.

Lai, A. K. Y., et al., "A Novel Antenna for Ultra-Wide-Band Applications", IEEE Transactions on Antennas Propagation, vol. 40, No. 7, Jul. 1992, pp. 755-760.

Skolnik, M. I., "Introduction to Radar Systems", Second Edition, ISBN #0-07-057909-1, McGraw-Hill Book Company, 1980, pp. 375-376.

Web pages, http://www.owlnet.rice.edu/~elec43...jects96/pictomaniacs/previous.html, Jan. 19, 2000, 3 pages.

Williams, D. A., "Millimetre Wave Radars for Automotive Applications", International Microwave Symposium Digest, Jun. 1-5, 1992, pp. 721-724.

* cited by examiner

RADAR SYSTEM USING RF NOISE

This application is a continuation-in-part of U.S. application Ser. No. 10/355,627, filed Jan. 31, 2003, which will issue as U.S. Pat. No. 6,864,834 on Mar. 8, 2005. The entirety of each reference is hereby incorporated by reference in its entirety.

BACKGROUND OF THE INVENTION

The present invention relates generally to radars. More particularly, an exemplary embodiment of the present invention may be useful as a noise radar. For instance, an exemplary embodiment of the present invention may use transmitted noise in the radio frequency (RF) range. As used herein, the term "noise" shall be understood to include random noise as well as pseudorandom noise.

Radars are used for a variety of purposes. For example, radars are used to detect the speed at which a target (e.g., a vehicle, a ball, a person, etc.) is traveling. Radars, such as in security systems, are also used to detect other types of movement. In addition, radars are also used to determine the presence of a target.

Despite the many benefits, conventional radars have a number of significant drawbacks. For instance, obstructions such as buildings, foliage, and other types of structures or vegetation may impede the performance of a radar by blocking or deflecting the signals transmitted by the radar. In addition, the signals used by other types of electronic devices may interfere with the performance of radar. As might be expected, the signals transmitted by the radar can also interfere with the functioning of other electronic devices. Furthermore, conventional radars may not be adapted to identify or classify specific types of targets.

In light of the drawbacks of conventional radars, a need exists for an improved radar that optimizes the signal to clutter ratio. A need also exists for an improved radar that is adapted to identify and/or classify specific targets. Yet another need exists for an improved radar that is less susceptible to interference from other electronic devices. A further need also exists for an improved radar that is less likely to impede the performance of other electronic devices.

SUMMARY OF THE INVENTION

The present invention is a radar that may use transmitted radio frequency noise or other suitable signals. However, it should be recognized that some embodiments of the present invention may use transmitted signals outside of the radio frequency range. An exemplary embodiment of the present invention may utilize predetermined, pseudorandom, or random waveforms that may be substantially matched to the impulse response of the radar and any surrounding clutter such that the signal-to-clutter ratio may be optimized and/or such that specific targets may be identified and/or classified.

One exemplary embodiment of the present invention is a radar system. This embodiment of the radar system includes a memory device that is adapted to store a first radio frequency waveform. Also, a second memory device is adapted to store a second radio frequency waveform. A timing device may be in communication with the first memory device and the second memory device. The timing device is adapted to delay an output of the second radio frequency waveform relative to the first radio frequency waveform. A mixer is then adapted to mix the delayed output of the second radio frequency waveform with a signal that is derived from the first radio frequency waveform interacting with a target.

Examples of the first memory device and the second memory device include sequential memory devices. A first-in/first out circuit (FIFO) is one exemplary embodiment of a sequential memory device. However, it should be recognized that the first memory device and the second memory device may not be identical components.

The radio frequency waveforms may be wide band radio frequency waveforms. In addition, the waveforms may be random, pseudorandom, or predetermined. In one exemplary embodiment of the radar system, the radio frequency waveforms may each have a bandwidth of at least about 100 MHz. For example, the bandwidth may be between about 100 MHz and about 10 GHz (e.g., about 500 MHz or about 800 MHz). However, it should be recognized that the radio frequency waveforms may each have a bandwidth greater than about 10 GHz.

The radar system may also include a low pass filter adapted to filter an output of the mixer. Additionally, the radar system may comprise at least one antenna that is adapted to transmit the first radio frequency waveform (or the output of a filter for the first radio frequency waveform) and to receive the signal that is derived from the transmitted signal interacting with the target. An exemplary embodiment of the radar system may also include a computer in communication with the first memory device and the second memory device, wherein the computer is adapted to determine the first radio frequency waveform and the second radio frequency waveform. Also, a first filter may be in communication with the first memory device such that it is adapted to filter the first radio frequency waveform. Similarly, a second filter may be in communication with the second memory device such that it is adapted to filter the second radio frequency waveform. For example, the first memory device and the second memory device may each be a 1-bit wide FIFO. An exemplary embodiment of the radar system may also include a respective D/A converter in communication with each memory device. One D/A converter may be adapted to convert the first radio frequency waveform, and the other D/A converter may be adapted to convert the second radio frequency waveform. Furthermore, an oscillator may be included that is adapted to provide a third radio frequency waveform. A second mixer may be in communication with one D/A converter and the oscillator. The second mixer may be adapted to mix an output of the D/A converter with the third radio frequency waveform. In addition, a third mixer may be included that is in communication with the first mixer and the oscillator, wherein the third mixer is adapted to mix the third radio frequency waveform with a signal that is derived from an output of the second mixer interacting with the target. In such an embodiment, the first mixer may be adapted to mix an output of the second D/A converter with an output of the third mixer.

Another exemplary embodiment of the radar system may include a 1-bit wide FIFO memory device that is adapted to store a first radio frequency waveform. A second 1-bit wide FIFO memory device may also be included that is adapted to store a second radio frequency waveform. A timing device may be in communication with the first memory device and the second memory device. The timing device is adapted to delay an output of the second radio frequency waveform relative to the first radio frequency waveform. A first filter may be in communication with the first memory device such that it is adapted to filter the first radio frequency waveform. Similarly, a second filter may be in communication with the second memory device such that it is adapted to filter the second radio frequency waveform. A mixer may be included that is adapted to mix an output of the second filter with a signal that is derived from an output of the first filter interacting with a target. Additionally, this embodiment of the radar system may include any of the optional or preferred features of the other embodiments of the present invention.

In yet another embodiment of the radar system, a first memory device stores a first radio frequency waveform, and a second memory device stores a second radio frequency waveform. A timing device may be in communication with the first memory device and the second memory device. The timing device may be adapted to delay an output of the second radio frequency waveform relative to the first radio frequency waveform. A first D/A converter may be in communication with the first memory device, wherein the first D/A converter is adapted to convert the first radio frequency waveform. Similarly, a second D/A converter may be in communication with the second memory device such that it is adapted to convert the second radio frequency waveform. An oscillator may be provided that is adapted to provide a third radio frequency waveform. A first mixer may be in communication with the first D/A converter and the oscillator. The first mixer may be adapted to mix an output of the first D/A converter with the third radio frequency waveform. Additionally, a second mixer may be in communication with the oscillator. The second mixer may be adapted to mix the third radio frequency waveform with a signal that is derived from an output of the first mixer interacting with a target. Furthermore, a third mixer may be in communication with the second D/A converter and the second mixer, wherein the third mixer is adapted to mix an output of the second D/A converter with an output of the second mixer. A low pass filter may be included that is adapted to filter an output of the third mixer. Also, at least one antenna may be adapted to transmit an output of the first mixer and to receive the signal that is derived from the output of the first mixer interacting with the target. This embodiment of the radar system may also include any of the optional or preferred features of the other embodiments of the present invention.

It should be recognized that each memory device of the present invention may be used to store a plurality of waveforms. The waveforms may be output in a predetermined order to facilitate the identification of a variety of different targets. For one example, each noise waveform may be predetermined to have certain characteristics (e.g., frequency, amplitude, etc.) which facilitate the identification of a particular target of interest. One such exemplary radar system comprises a first memory device adapted to store and output at least one waveform and a second memory device adapted to store and output at least one waveform. In particular, the first memory device and/or the second memory device may be adapted to store and output a plurality of different waveforms. In one exemplary embodiment of this radar system, the first memory device may be adapted to store a plurality of different waveforms and output them in a predetermined order. In another exemplary embodiment, the second memory device may be adapted to store a plurality of different waveforms and output them in a predetermined order. A timing device is in communication with the first memory device and the second memory device. The timing device is adapted to delay an output of the second memory device relative to the output of the first memory device. Thereafter, a mixer is adapted to mix the output of the second memory device with a signal that is derived from the output of the first memory device interacting with a target. It should be understood that this embodiment of the radar system may include any of the optional or preferred features of the other embodiments of the present invention.

A radar system of the present invention may also include more than two memory devices. This is an example of another type of system of the present invention which may facilitate the identification of a variety of targets. In particular, the output of each memory device may be a predetermined waveform having certain characteristics that facilitate the identification of particular targets of interest. For example, there may be a plurality of memory devices that are adapted to output waveforms to interact with a target, and/or there may be a plurality of memory devices that output waveforms to be mixed with a signal reflected from a target.

In one exemplary embodiment of this radar system, a first memory device is adapted to store and output at least one waveform. There are a plurality of additional memory devices, each adapted to store and output at least one waveform. A timing device is in communication with the first memory device and the additional memory devices. The timing device is adapted to delay each output of the additional memory devices relative to an output of the first memory device. Multiple mixers are also included. Each of the mixers is adapted to mix the output of a respective one of the additional memory devices with a signal that is derived from the output of the first memory device interacting with a target. This embodiment of the radar system may include any of the optional or preferred features of the other embodiments of the present invention.

In another example of the radar system, a first memory device is adapted to store and output at least one waveform. The radar system also includes a plurality of additional memory devices, each adapted to store and output at least one waveform for interacting with a target. The additional memory devices may be adapted to provide output simultaneously or in a predetermined order. A timing device is in communication with the first memory device and the additional memory devices. The timing device is adapted to delay an output of the first memory device relative to an output of one of the additional memory devices. A mixer is adapted to mix the output of the first memory device with a signal that is derived from the output of one of the memory devices interacting with a target. In addition, this embodiment of the present invention may include any of the optional or preferred features of the other embodiments of the present invention.

The present invention is not limited to embodiments that utilize multiple memory devices. Some exemplary embodiments of the present invention may only utilize a single memory device. In such embodiments, a single output of the memory device may be used for a respective waveform, or multiple outputs of the memory device may be combined to produce a waveform. Regardless, a single memory device may be used to produce multiple waveforms for use in the radar. One example is a radar system that comprises a memory device and a mixer. The memory device is adapted to provide a first signal and a second signal, and the mixer is adapted to mix the second signal with a signal that is derived from the first signal interacting with a target. Another example is a radar system that also comprises a memory device and a mixer. In this embodiment, a first signal may be produced from at least one of the outputs of the memory device, and a second signal may be produced from at least one of the outputs of the memory device. The mixer is then adapted to mix the second signal with a signal that is derived from the first signal interacting with a target.

Such embodiments may include any of the optional or preferred features of any of the other embodiments of the present invention.

Other embodiments are possible and included within the scope of the present invention. One example is a radar system adapted to transmit a first signal, wherein the radar system comprises a memory device and a mixer. The memory device is adapted to provide a second signal, and the mixer is adapted to mix the second signal with a signal that is derived from the first signal interacting with a target. In another exemplary embodiment in which a radar system is adapted to transmit a first signal, the radar system comprises a memory device that is adapted to provide multiple outputs such that a second signal may be produced from the outputs. A mixer is then adapted to mix the second signal with a signal that is derived from the first signal interacting with a target. Of course, these exemplary embodiments may also include any of the optional or preferred features of any of the other embodiments of the present invention.

In addition to the novel features and advantages mentioned above, other features and advantages of the present invention will be readily apparent from the following descriptions of the drawings and exemplary embodiments.

DETAILED DESCRIPTION OF EXEMPLARY EMBODIMENT(S)

Figure 1:
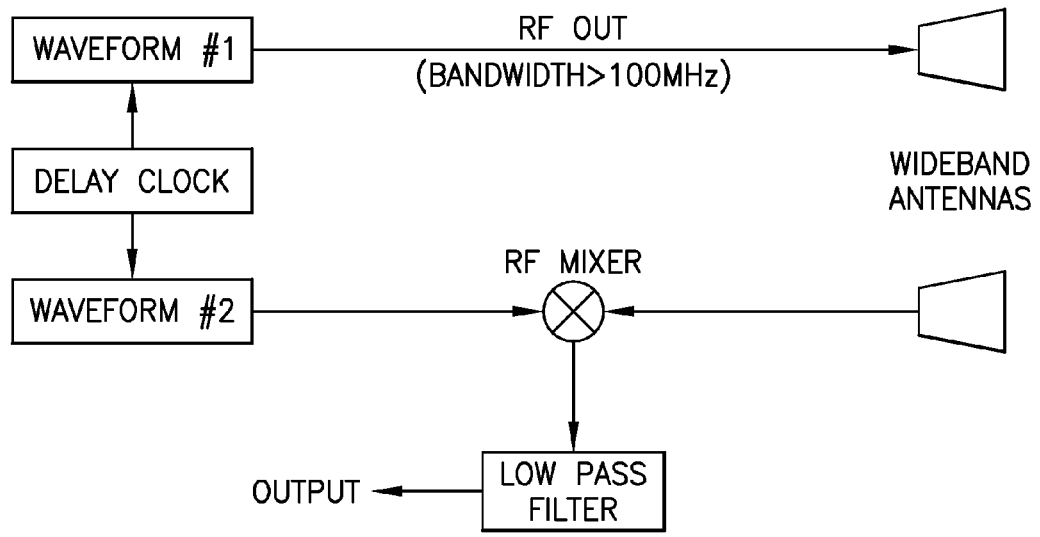
FIG. 1 is a diagram of an exemplary embodiment of a matched-waveform noise radar of the present invention.

The present invention is directed to a radar that may use transmitted radio frequency noise. An exemplary embodiment of a matched-waveform noise radar of the present invention is shown in FIG. 1. In this example, a wide band radio frequency waveform may be stored in a memory device such as a sequential memory device. An exemplary embodiment of the waveform may be carrier-free and designed for a specific target (including target distance) and clutter conditions. In addition, an example of the waveform may operate over a broadband of frequencies and have a low voltage, thus enabling the use of microchips and other similar or related electronics. The waveform is radiated by at least one transmitter antenna. The waveform may propagate to a target in what may be a complex, perhaps dispersive, environment. The waveform may interact with the target of interest as well as other objects (i.e., clutter), thereby changing the waveform. The new, reflected waveform may be the convolution of the antenna and propagation environment transfer function as well as the radar target and radar clutter scattering transfer function (i.e., the target and clutter impulse response). Meanwhile, another input waveform may be stored in a second memory device. This second input waveform may be substantially similar or dissimilar to the transmitted waveform. In an exemplary embodiment of the present invention, the second input waveform may also be designed for a specific target (including target distance) and clutter conditions. The second waveform may be clocked delayed and sent to a RF mixer. The reflected signals from the target and clutter are also transmitted to the RF mixer by at least one receiving antenna (which may be in the same or different architecture as the transmitting antenna). For optimum correlation of the signals in an exemplary embodiment of the present invention, the second waveform may substantially match the desired portion of the reflected waveform from the target and clutter. The output of the mixer may then be filtered (e.g., low-pass filtered) and transmitted as a slowly varying voltage waveform to a processing device. For example, a system computer may be used to analyze the voltage waveform to identify and/or classify the target.

It should be recognized that the resultant voltage waveform may be the real time radar cross correlation coefficient. The combination of the RF mixer and the filter may perform real time analog correlation. As a result, the delay function for the reference signal (i.e., the second input waveform) may extend this function to real time analog cross correlation. The second input waveform may be synthesized such that the cross correlation achieves a number of desired functions. For example, the second input waveform may be selected to produce a maximum cross correlation with the signal scattered from a specific type of target (i.e., target of interest). As a result, the radar of the present invention may be optimized for detecting a specific target of interest. Examples of targets include, but are not limited to, those that may be detected by known radar systems. For instance, the radar system may be used to detect people, moving objects, stationary objects, metal objects, pipes, bars, trees, curbs, fire hydrants, telephone poles, fences, cinder blocks, pot holes, weapons, vehicles, tumors, and an endless number of other types of objects. In addition, the radar of the present invention may be used for night vision. Furthermore, the second input waveform may be designed to maximize the correlation response from a target of interest while also minimizing the response from the clutter (such as buildings, grass, weeds, trees, etc.). In fact, many other designs are possible. Special pairs of the input waveforms may be designed to perform desired functions including, but not limited to, target identification and classification, target-to-clutter optimization, and to compensate for the dispersive effect of complex propagation environments (such as through walls of buildings, through foliage, or under ground, etc.).

The particular bandwidth of an input waveform may be selected to optimize the signal to clutter ratio and/or to facilitate the identification and/or classification of a specific target. The center frequency is in the desired radar band for the particular purpose of the radar. The particular frequency band may be selected based on a variety of factors including, but not limited to, the type of targets, the type of clutter, component (including antenna) specifications, the desired degree of resolution, and other factors which relate to the performance of the system. As noted above, the radar-transmitted signal may be a waveform with a frequency spectrum that extends over a wide band of frequencies. The frequency spectrum may range from about 0 Hz to frequencies in excess of 10 GHz. For example, an input waveform may have bandwidth of at least about 100 MHz. For instance, an input waveform may have a bandwidth in the range from about 100 MHz to about 10 GHz (e.g., about 800 MHz). Some exemplary embodiments of an input waveform may have a bandwidth in the range from about 100 MHz to about 500 MHz or from about 300 MHz to about 350 MHz. Nevertheless, in certain embodiments of the present invention, the bandwidth of an input waveform may be less than about 100 MHz or greater than about 800 MHz or even greater than about 10 GHz.

Figure 2:
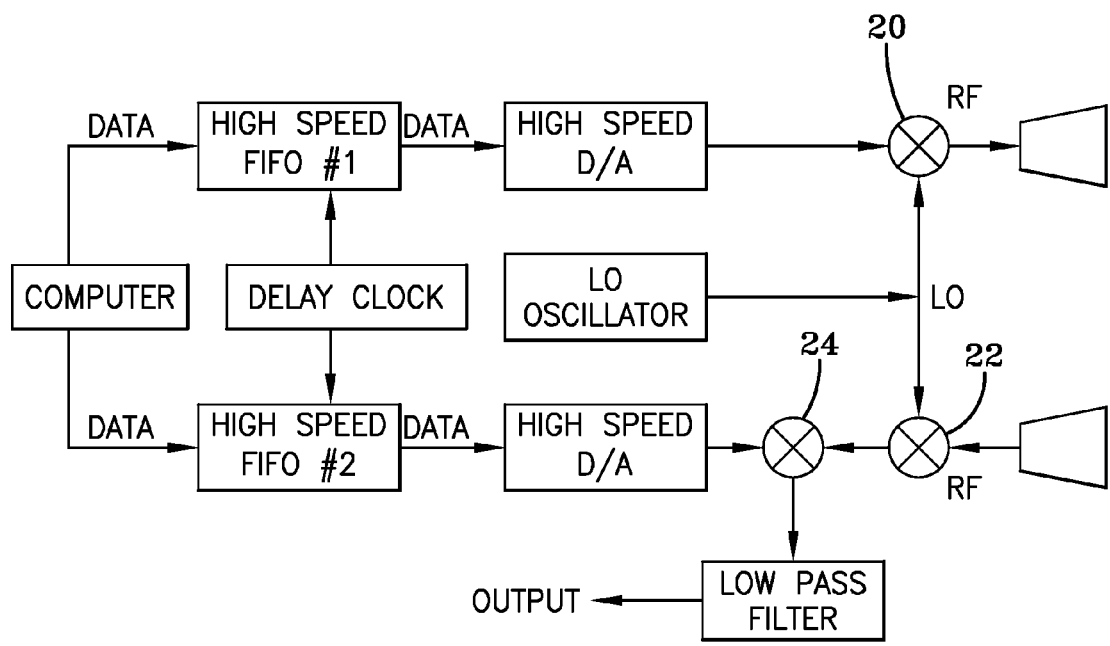
FIG. 2 is a diagram of an exemplary embodiment of a matched-waveform noise radar of the present invention which uses up/down RF conversion.

Another exemplary embodiment of the present invention is shown in FIG. 2. Optional amplifiers are omitted for clarity. This embodiment of the present invention utilizes up/down RF conversion. Two high-speed FIFO memory devices are used to store the input waveforms. The FIFO memory devices may be digital chips that hold an array of data that may be sequentially clocked out of memory. The memory is clocked out in the same order in which it is loaded (rather than randomly accessed). For example, an embodiment of a FIFO memory device may have more than about 32,000 nine-bit words available with a speed greater than about 100 MHz (e.g., greater than about 300 MHz). A D/A converter may be in communication with each memory device. The speeds of any associated D/A converters may run at about the same speeds as the memory devices. However, a computer may load the data into the memory at a relatively low speed. After the specially designed input waveforms are loaded into memory, the clock may be enabled, and the memory may run, for example, at 100 MHz or more. Differential delays may be implemented using delay triggers with the clock or by using a built-in offset address setting in the memory device. An oscillator may be provided that is adapted to provide another input radio frequency waveform. A first mixer 20 may be in communication with a D/A converter and the oscillator. The first mixer 20 may be adapted to mix an output of the D/A converter with the input waveform from the oscillator. Additionally, another mixer 22 may be in communication with the oscillator. The second mixer 22 may be adapted to mix the input waveform from the oscillator with a signal that is derived from an output of mixer 20 interacting with a target. Furthermore, a third mixer 24 may be in communication with the other D/A converter and the mixer 22, wherein the third mixer 24 is adapted to mix an output of the second D/A converter with an output of the mixer 22. A low pass filter may be included that is adapted to filter an output of the mixer 24. Also, at least one antenna may be adapted to transmit an output of the mixer 20 and to receive the signal that is derived from the output of the mixer 20 interacting with the target. The radar may be relatively small and low cost. In one exemplary embodiment of this radar system, the radar was able to track a person carrying a radar reflector to a distance of more than 170 feet using less than 1/10 watt of power.

Figure 3:
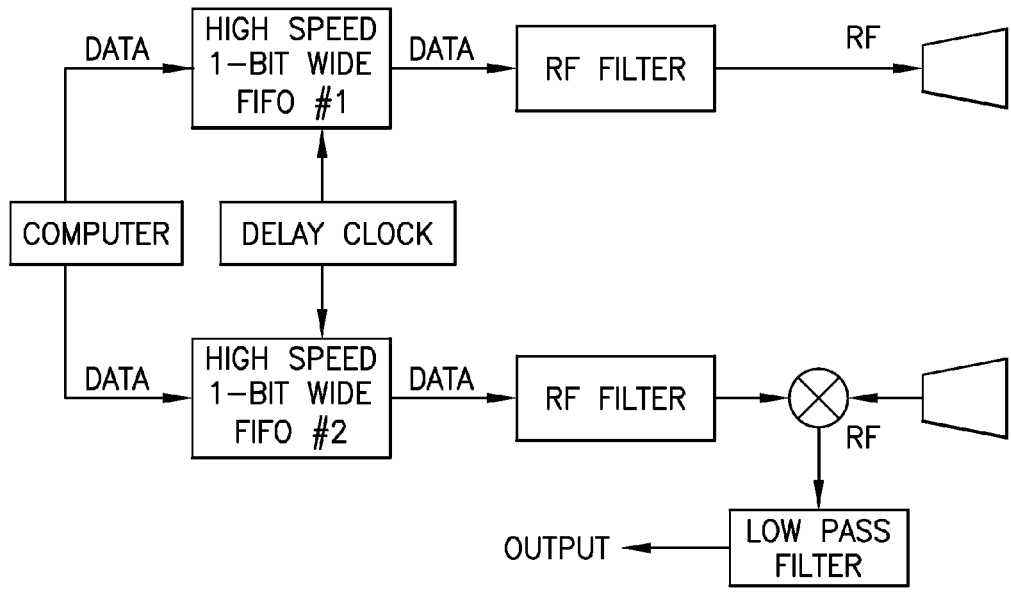
FIG. 3 is a diagram of an exemplary embodiment of a matched-waveform noise radar of the present invention which uses RF filters.

Another embodiment of the present invention may implement direct filtering of the outputs of the memory devices. FIG. 3 shows an example of such an embodiment. This embodiment of the present invention recognizes that although the clock speed of the memory devices may be greater than about 100 MHz, the RF signal bandwidth may have components that extend to at least more than 10 times that because of the rise time of the pulses. Accordingly, this example uses only one-bit serial data (i.e., the output may be a single set of voltage levels representing the desired waveforms). The RF filters may then select the bandwidth over which the system is to operate and extract the desired components of the memory output. The output signals may need to be significantly amplified. However, the amplifiers are not shown for clarity. In such an embodiment, the new, reflected waveforms from the target may not be linearly related to the second input waveform. Accordingly, consideration must be given to this fact when designing the waveforms to optimize signal-to-clutter ratio or to classify a specific target.

Figure 16:
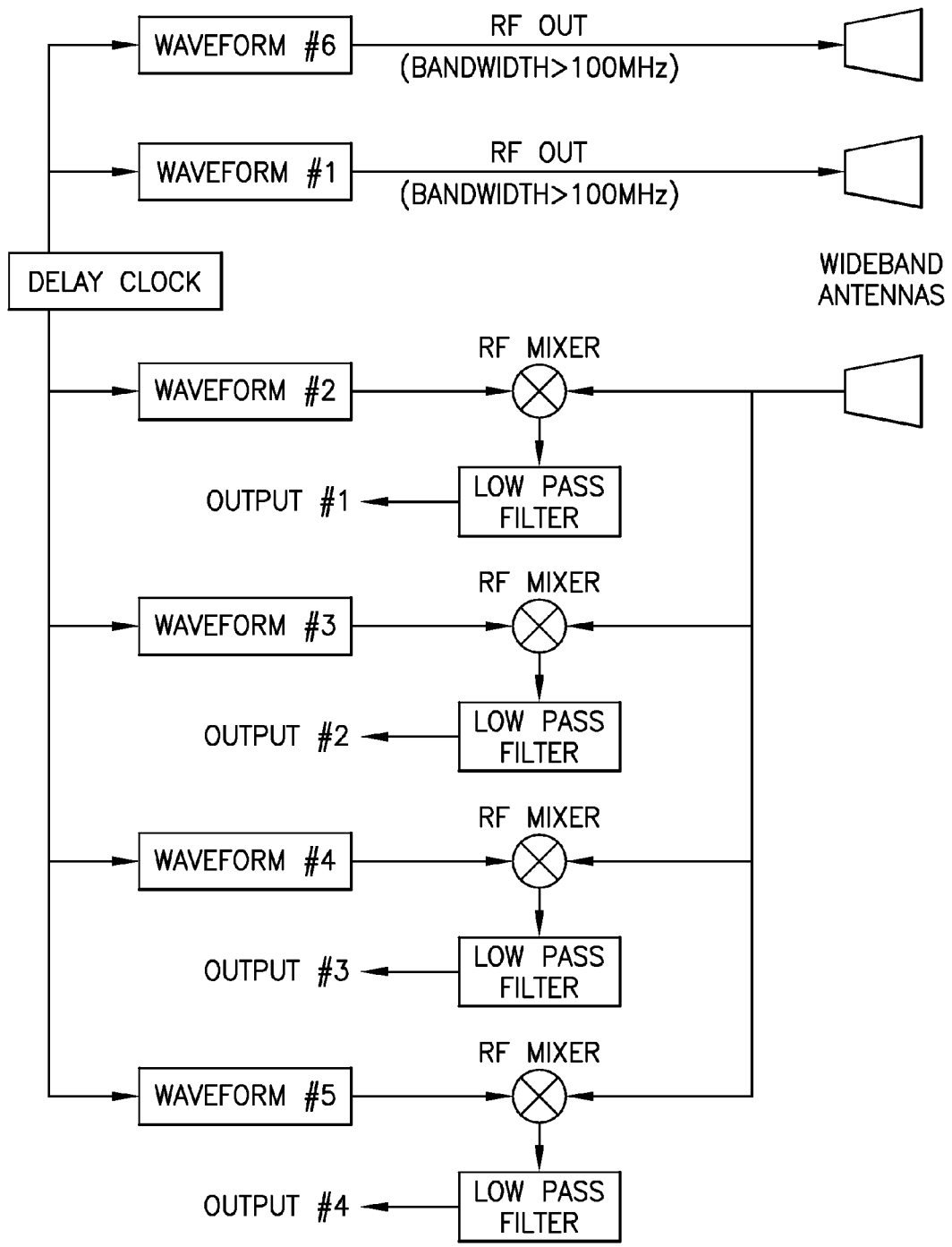
FIG. 16 is a diagram of another exemplary embodiment of a matched-waveform noise radar of the present invention which produces a plurality of outputs.
Figure 17:
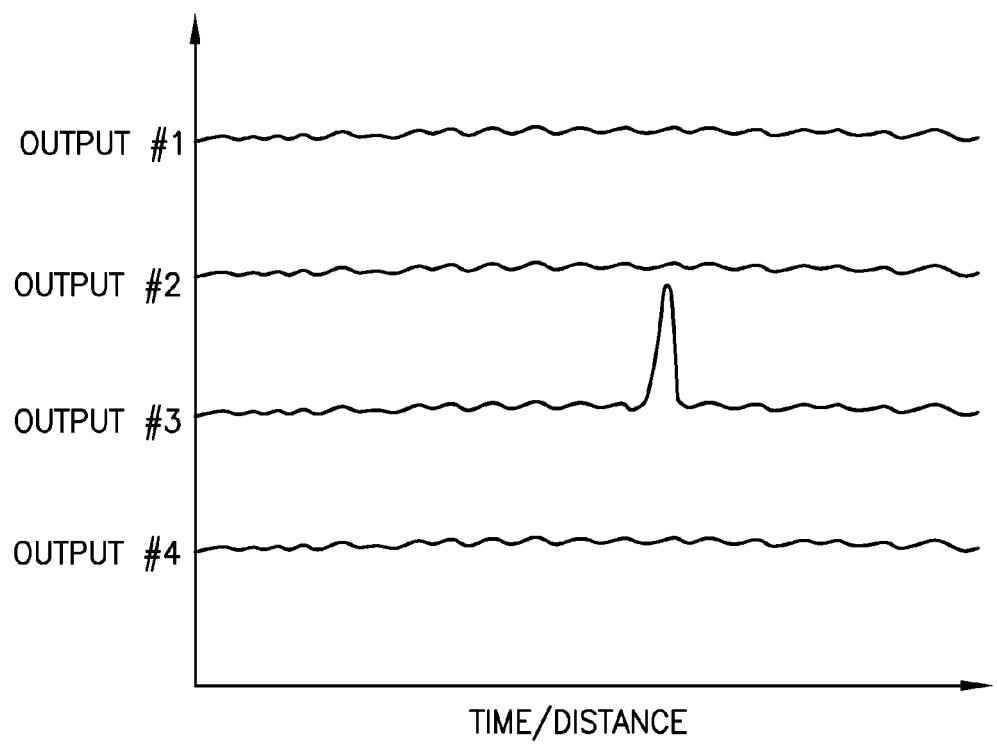
FIG. 17 is a graph of exemplary outputs which may be produced by the radar system of FIG. 16.

As mentioned above, a radar system may be used to detect multiple targets. For example, FIGS. 2 and 3 illustrate radar systems in which each of the memory devices may be used to store a plurality of specially designed waveforms. A timing device may then be used to output the waveforms in a predetermined order. It should also be recognized that any of the aforementioned embodiments of the radar system of the present invention may incorporate additional memory devices. FIG. 16 shows an example of a radar system that includes a plurality of memory devices that are adapted to store and output waveform #2, waveform #3, waveform #4, and waveform #5, respectively. These waveforms may be output simultaneously. Alternatively, these waveforms may be clocked out in a predetermined order. These waveforms may be delayed relative to waveform #1. After waveform #1 reflects from a target, the reflected signal may be mixed with waveform #2, waveform #3, waveform #4, and waveform #5, respectively. In one exemplary embodiment, each pair of signals may be designed to identify and/or classify a specific target when cross-correlated. The resulting outputs (i.e., output #1, output #2, output #3, and output #4) may be then be monitored to determine if the radar system detected any of the specific targets. For example, FIG. 17 shows a graph of an exemplary output #1, output #2, output #3, and output #4 versus time/distance. In this example, output #3 detected a specific target at a particular time/distance as indicated by the impulse response peak.

It should be recognized that a radar system of the present invention may also include a plurality of waveforms for interacting with a target. In the exemplary embodiment of FIG. 16, the radar system includes another memory device for producing waveform #6. Waveforms #1 and #6 may be output simultaneously or in a predetermined order. Each of these waveforms may be specifically designed to facilitate the detection of a particular target of interest. After interacting with a target of interest, the resulting signal may be cross-correlated with one or more other waveforms to detect the target of interest.

As noted above, a memory device may be used to store a plurality of waveforms. Accordingly, some exemplary embodiments of the present invention may utilize only a single memory device. For example, each output (i.e., 1 bit) of the memory device may be used for a respective waveform. Thus, multiple waveforms may be produced for use in the radar. For another example, a group of the outputs of the memory device may be combined to produce a waveform. As a result, multiple groups of the outputs may be used to produce multiple waveforms. Regardless of the method, a single memory device may be used to produce multiple waveforms for use in the radar. If desired, both methods of producing waveforms may be used in an exemplary embodiment of the present invention.

Figure 18:
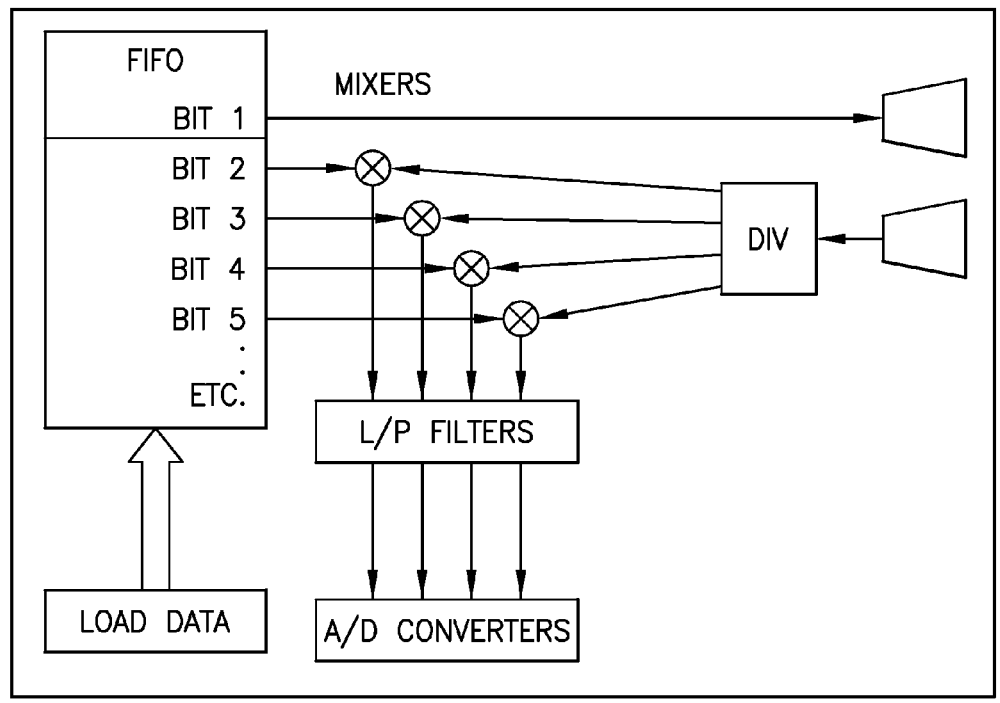
FIG. 18 is a diagram of an exemplary embodiment of a radar system of the present invention that utilizes a single memory device.

FIG. 18 shows an example in which each output of the memory device may be used to produce a respective signal. Optional RF amplifiers have been omitted for clarity. In this exemplary embodiment, the memory device is a FIFO circuit. A computer or another suitable processing device may generate sets of waveforms and write them into the memory. For example, one output bit (e.g., output bit #1) may be used as a prime output that may be transmitted by an antenna such that it interacts with a target. Another output bit may be used to produce a delayed output. In other words, the sequence of the output may be delayed relative to the prime output. As a result, the delay may not be dependent on a timing circuit. As shown in FIG. 18, other output bits may also be used to produce delayed outputs, if desired. For example, an 18-bit memory device may optionally have one prime output and 17 delayed outputs. A signal that is derived from the prime output interacting with a target may then be mixed with a delayed output. In particular, multiple mixers are provided in this example. Each mixer is adapted to mix a respective delayed output with a respective signal derived from the prime output interacting with a target. As in this example, a divider circuit or another suitable circuit may be used to produce respective signals that are derived from the prime output interacting with a target if there are multiple delayed outputs. Optionally, at least one low pass filter may be used to filter the output of each mixer. Furthermore, the radar system may also include at least one analog-to-digital (A/D) converter in communication with the low pass filter(s) to facilitate processing of the resultant signals.

The exemplary embodiment shown in FIG. 18 may offer multiple benefits. As mentioned above, the delay is not dependent on the operation of a timing circuit. In other words, a single timing circuit may be used to simultaneously clock all of the waveforms out of memory. Furthermore, using each output of the memory device means that each channel only has a one-bit shift level. This enables the use of a smaller and faster memory device.

Figure 19:
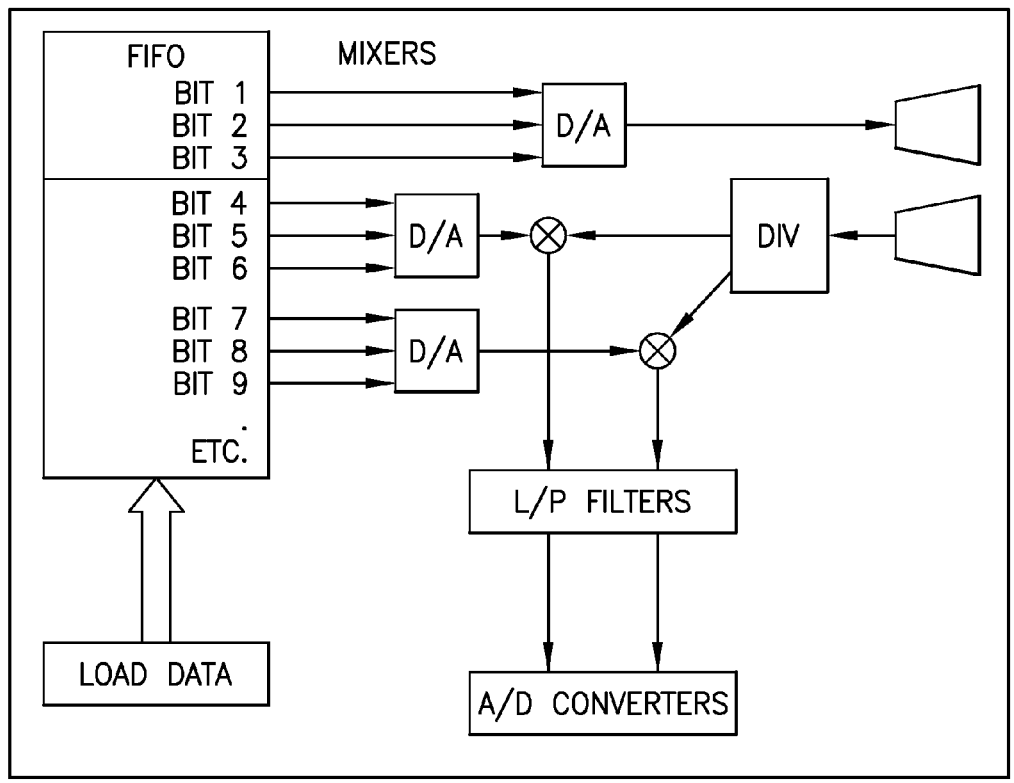
FIG. 19 is a diagram of another exemplary embodiment of a radar system of the present invention that utilizes a single memory device.

FIG. 19 illustrates another exemplary embodiment of a radar system that may utilize just one memory device. In this example, a group of the outputs (e.g., bits 1–3) are used to produce a prime output. In particular, a digital-to-analog (D/A) converter or another suitable circuit may be used to combine the outputs to produce the prime output. A delayed output may also be produced in this manner. For instance, another group of bits (e.g., bits 4–6) may be combined by a D/A converter or another suitable circuit to produce a delayed output. If desired, other delayed outputs may also be produced. In this exemplary embodiment, another group of bits (e.g., bits 7–9) may be used to produce another delayed output.

This exemplary embodiment also offers many benefits. For example, using a group of the outputs of the memory device enables the production of a multilevel analog signal. In particular, using a group of the outputs enables the use of a very high speed D/A converter to combine the outputs to create an analog value with $2^n$ levels, where n is the number of bits in the group. A multiple level analog-type output may have more degrees of freedom (e.g., information content) than just a 1-bit level shift. As a result, the resolution of the cross-correlation may be greater for the same memory speed.

As an alternative to the embodiments shown in FIGS. 18 and 19, it should be recognized that the prime output in each example may be provided by a separate memory device. For example, bit 1 in FIG. 18 may be replaced by another memory device. Similarly, another memory device may be substituted for bits 1–3 in FIG. 19. In such embodiments, there may be separate clocks with separate speeds for the prime output bit(s) and the delayed output bit(s). This allows a "sliding waveform" approach to generating the range profiles rather than just fixed delay times.

EXAMPLES

An exemplary embodiment of a stealthy noise radar for vehicle obstacle avoidance was built. This example of the noise radar achieved stealth by using a noise-like (pseudorandom) waveform with more than 700 MHz of bandwidth. The radar used parallel analog cross correlation for receiving. This provided protection from jamming (accidental due to local communications transmitters or deliberate) as well as mitigation of interference caused by the radar. Several radars of the same design can be operated in the vicinity of each other without interfering each other.

The radar was mounted on a stationary support and tested in a foliage environment. It showed that it can detect, range, and/or classify obstacles such as humans, cinder blocks, metal cylinders, various size trees, tree stumps, rocks, and holes. In particular, this embodiment could detect humans to 250 feet and small trees to 350 feet.

The radar, for example, may use a single steered-beam antenna or a multi-beam antenna. A multi-beam antenna may reduce cost and antenna complexity with no reduction in performance. With this antenna configuration, the system can operate as a multi-element array allowing 2-dimensional imaging of the radar scattering field in the foreground of the vehicle.

Preliminary Data Using a Frequency Domain Radar

A swept-frequency or step-frequency radar (i.e., a frequency domain radar) was used to study propagation and imaging. Although a frequency domain radar is a substantially different system than a noise radar of the present invention, the basic bandwidth and propagation characteristics may be about the same for a noise radar of the present invention. As a result, this preliminary testing supported the capability of a noise radar of the present invention.

Two imaging methods were used during the preliminary testing to represent the collected array data as a 2-D array of radar scatterers in a crossrange vs. downrange image. These methods are, the "direct" imaging method or the 2-Dimensional Inverse Fast Fourier-Transform (2D-IFFT), and the backprojection algorithm. These two methods compliment each other in speed and resolution, hence creating an application-specific need for each. However, a 2D-FFT algorithm requires measurement in the frequency domain. On the other hand, a noise radar may operate in the time domain.

With the use of both algorithms, the method of collecting data and the preliminary math may be similar. Data may be collected in a 2-D array as a function of frequency and crossrange antenna movement. An inverse Fourier-transform may be performed on each column of frequency data, creating a range-profile. It should be noted that data could also be collected in the time-domain using a noise radar of the present invention, eliminating the processing time needed to perform this initial transformation.

In the 2D-FFT method, a row-wise Fourier Transform was performed on the range-profile, which condensed the streaks seen in the display image of the data into localized scattering centers in real cross-range position. Fast algorithms for these procedures are common and allow near real-time imaging. The main drawback of this method may be the assumption that all scatterers in the image are in the far-zone of the antenna. When this requirement is not met, the scattering centers of near-field targets may appear smeared over the crossrange, while the targets in the far-zone are suitably focused. For this reason, the backprojection algorithm may be used primarily to image near-field objects in detail.

Backprojection imaging may be used with the noise radar of the present invention. Backprojection is an imaging method that may operate solely in the time-domain. The time-domain response from one stationary antenna represents the impulse response from targets in the downrange as a function of the total delay (antenna-to-target-to-antenna). With data from one antenna, it may only be possible to calculate distance to the target using $d=c \cdot T/2$ with c as the speed of light. The target's placement in the crossrange may be determined through finding the point in the foreground where the scattering responses from two or more antennas intersect. The resolution of this type of system may depend on the number and spacing of the antennas.

Generally, the procedure may consist of circularly interpolating each antenna's data, then adding all of the antenna responses. Because of this channel-by-channel processing, the backprojection method may require more CPU time than the 2D-FFT method for a frequency domain radar. However, since this algorithm may be based on propagation time only, no plane-wave assumptions may be required and targets in the near-field of an antenna can be imaged accurately.

Imaging from a moving vehicle may be time-intensive and targets of interest may be approaching from well outside of the antenna's near-zone. For these reasons, the 2D-FFT may be a preferred imaging mode for some applications of a frequency domain radar, with the backprojection method being used when appropriate to its time restrictions.

Testing with a frequency domain radar was carried out using one antenna on a moving probe to simulate an array of many antennas. A computer system precisely set each antenna position and recorded frequency data from a network analyzer. The network analyzer measured transmission characteristics with a 2–18 GHz AEL standardized horn antenna attached to its transmit and receive ports through SMA cables. This analyzer was interfaced to the computer system with a GPIB connection. The computer system was also interfaced to a standard stepper motor controller through a parallel input-output connection. Finally, the stepper motor controller sent position feedback information to the motor attached to the moving probe.

In this example, the probe was set horizontally at a height of four feet, and the receive antenna was attached to the moving carriage. The transmit antenna was mounted on a tripod centered with the probe, 1 foot lower, and 3 inches forward. The computer, network analyzer, and motor controller were grouped to the side of the probe 20 feet away.

Tests recorded data over a frequency range of 2–6 GHz with 801 discretely sampled frequency points separated by 5 MHz. The receive antenna was moved to 84 independent probe positions spanning 7 feet and each separated by 1 inch. Via the Spatial Nyquist Theorem, the physical spacing may be at most one-half of a wavelength to eliminate the chance of spatial aliasing. Targets included a live tree, a 2' tall by 6" diameter metal cylinder, a horizontally placed cinder block, and a 1' deep by 1' wide pothole. Before testing in clutter, each of these targets was scanned in an open field of short grass to determine characteristics associated with each.

Using the imaging techniques described earlier, the characteristics of the targets were examined. In the absence of intervening foliage, the metal cylinder, cinder block, and tree were clearly detectable, with power return 4.5 times greater than the background for the tree and cylinder and 11 times greater for the cinder block.

In the absence of foliage, images using both the 2D FFT and the backprojection algorithm identified some differences in the characteristics of targets. Three targets are examined in detail: the 2' metal cylinder, the cinder block, and the tree. These targets differ in shape and composition and show several distinct traits. The cinder block had a flat vertical face, which is perpendicular to the incident wave direction and caused a greater reflection than the curved surface of the cylinder. This was apparent by viewing 2D FFT images of the two targets with a linear display and the same intensity scales. The return from the cinder block was roughly 2.5 times as great as that from the cylinder. There are also differences in the patterns of the two targets. The cinder block has its maximum return value localized in a single location with lesser returns surrounding this high intensity center. The aluminum cylinder exhibits a more distributed maximum return, which shows greater curvature, and in this instance, three separate maximum locations.

The tree had approximately the same RCS magnitude as the aluminum cylinder, power levels 4.5 times greater than the background level, while being 46 feet away, more than twice the distance of the cylinder or cinder block. At the same range as the cylinder or cinder block, the tree would show a larger return than either target as a result of its larger size.

The properties of the cylinder and cinder block described above are also apparent in the images created with the backprojection algorithm. The intensity offset of the cinder block from the background continues to show a greater value and more concentrated distribution than that of the aluminum cylinder.

Taking the images produced by both algorithms as a whole, the preliminary results indicated that features of the targets are clearly identifiable and may be built upon to distinguish between inconsequential targets and those of particular interest. Although the basic bandwidth and propagation characteristics were tested using a frequency domain radar, these test results are significant because the bandwidth and propagation characteristics may be about the same for a noise radar of the present invention.

The effect of foliage did not in this case degrade the image of a target; rather it introduced many extraneous scattering centers. The signal processing of the present invention enabled us to identify the targets using their characteristics and separate them from unimportant scatterers. Examining these images produced with the 2D FFT, the cylinder was clearly visible with a power 4 times greater than the background at a distance of 10 ft and 1.6 times greater at a distance of 20 ft. The tests showed that the present invention may identify targets whose line of sight may be obstructed by foliage. Background subtraction may be used to assist in the identification of the target, particularly if the target is in close proximity to the foliage scattering centers.

Noise Radar Hardware Design

Figure 4:
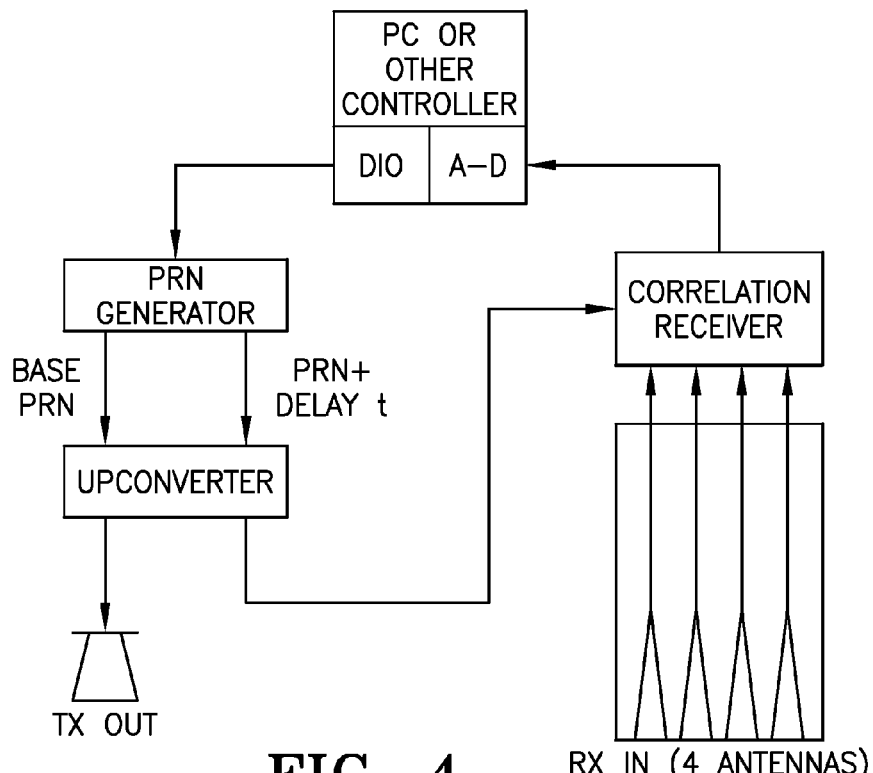
FIG. 4 is a diagram of another exemplary embodiment of the radar system of the present invention.

A block diagram for this exemplary embodiment of the noise radar system is shown in FIG. 4. In this embodiment, the controller (in this case a PC) is equipped with both digital in/out (DIO) and A-D converters. The DIO controls the pseudo-random noise (PRN) generator, which fabricates two identical noise-like waveforms, differing only in a user-controlled time offset. As will be described, this time offset determines the downrange distance at which the radar is "looking." Both waveforms are then upconverted to the chosen frequency band, where one is amplified and transmitted, while the delayed version is sent to the correlation receiver. The transmitted wave scatters from any targets, and is received through the antenna array, where it is correlated with the original delayed transmit signal. When the set delay equals the propagation time in the transmitted signal, a correlation peak occurs, signaling a reflection from a particular distance. The resultant correlation is directly proportional to the impulse response of the scattering targets convolved with that of the radar system. This output voltage is then recorded using a 12-bit A-D and delivered to the controller. One voltage value is recorded for each delay setting.

The parallel processing configuration may provide faster data collection speed than the alternate serial switched-antenna configuration, which may be desired for a moving vehicle-mounted radar. Each channel (per antenna) may perform the analog correlation simultaneously, only requiring the A-D to operate fast enough to record the output voltage in an approximate 2-millisecond window. In this configuration, the addition of more channels may not increase processing time, only the required number of independent A-Ds.

In this example, the transmission bandwidth chosen was 3.0-3.8 GHz, and resulted as a compromise between foliage penetration requirements, antenna size, and component specifications. This bandwidth conformed to a recent FCC Report and Order that could possibly ban other imaging systems from operating between 960 MHz and 3.1 GHz. Other constraints including transmission characteristics, size, cost, and complexity may also impact the selection of the transmission bandwidth.

Figure 5:
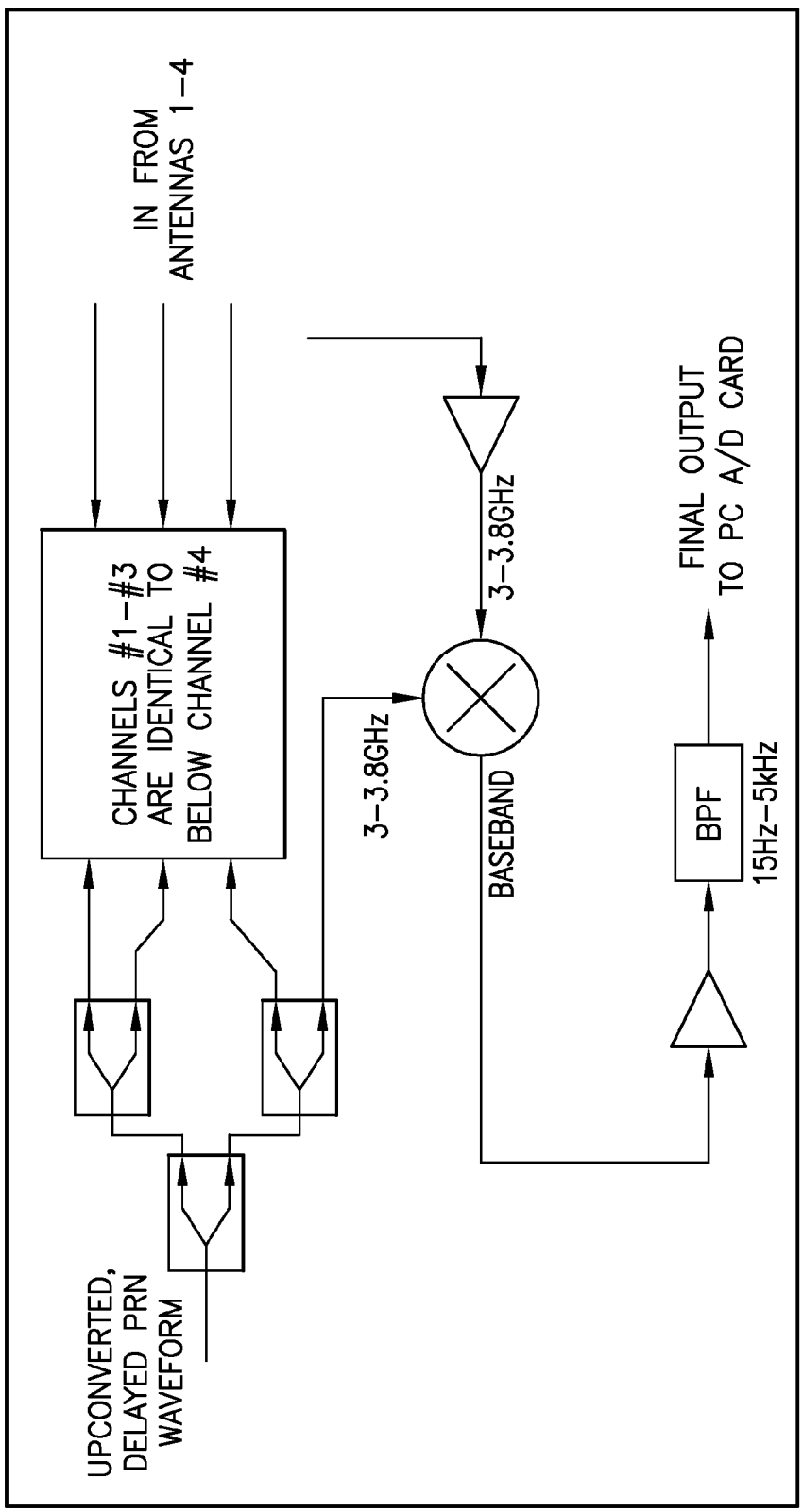
FIG. 5 is a diagram of an exemplary embodiment of a correlation-type receiver that may be utilized in each channel of the radar of the present invention.

FIG. 5 presents a block-diagram for the correlation-type receiver utilized in each channel of the radar of the exemplary embodiment. In this example, the major components of the receiver include power dividers, RF monolithic amplifiers, double-balanced frequency mixers, and op-amps. The local oscillator (LO) of each mixer is driven by the delayed noise-waveform. The mixers of this embodiment may operate optimally with a +10 dBm LO signal, but may be useful down to +4 dBm. Since the network of power dividers may add 6 dB of loss (3 dB per divider), the input signal to the receiver module may range from +10 to +16 dBm in this embodiment. The RF front end of the receiver is amplified (approximately +15 dB) and mixed down to base-band with 8 dB of conversion loss. High-order harmonics are then filtered out, and the final-stage BPF produces the voltage-output to be recorded.

The process of mixing and filtering in this example is the analog implementation of cross correlation between the transmitted and received signals. The correlation value may be directly proportional to the impulse response of the system, including the cables, antennas and scattering objects. The total recorded time-domain impulse response can then be represented as, $$h_{tot} = h_{targets} \otimes h_{radar}$$

where $\otimes$ is the convolution operator. This is the waveform that is recorded after correlation by the controller A-D converter. To isolate the target response from the radar response, reference measurements may be taken and used in post-processing calculations.

Figure 6:
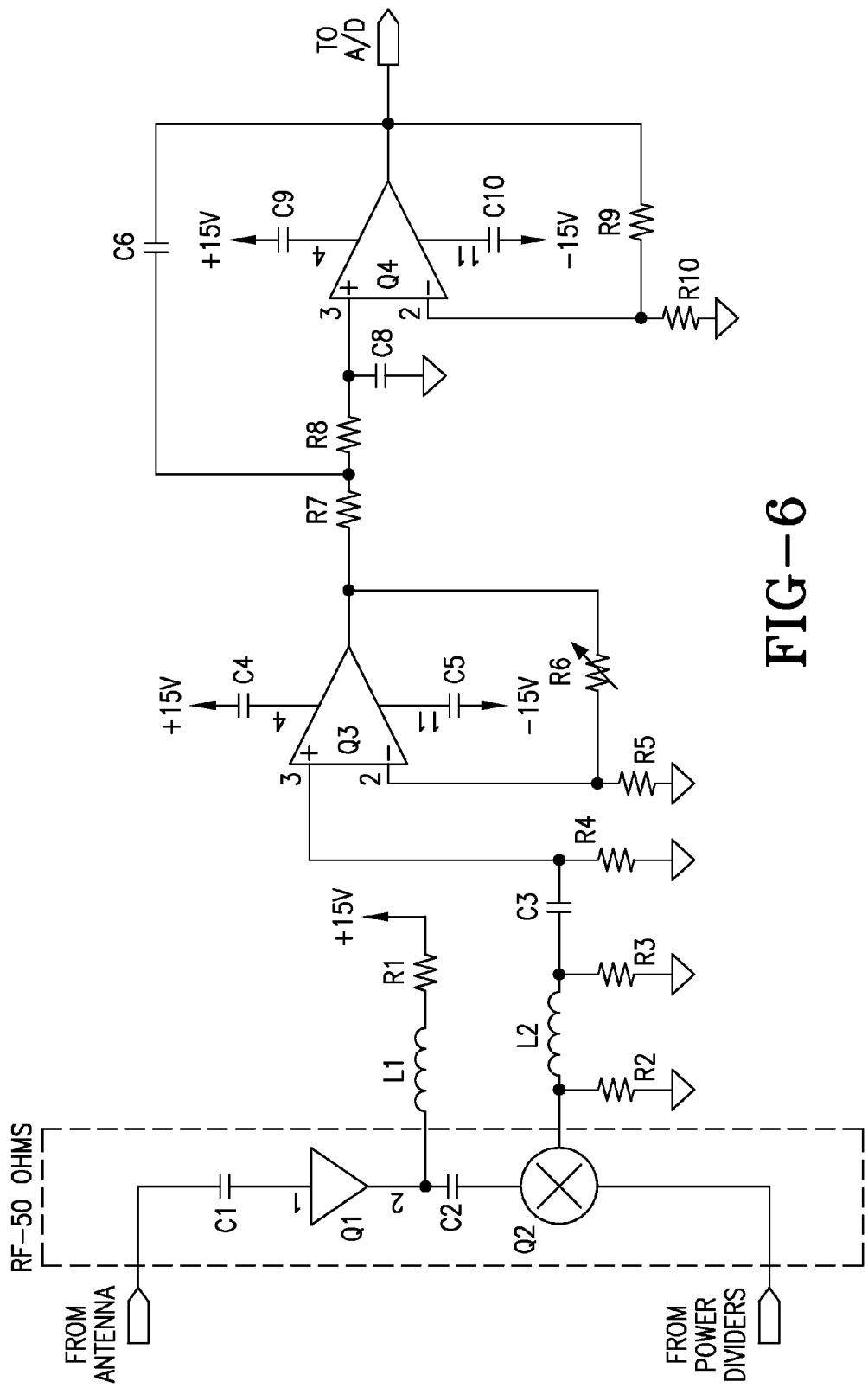
FIG. 6 is a schematic of an exemplary receiver module of the present invention.

A schematic of an exemplary receiver module is shown in FIG. 6. In this example, the gain of the receiver modules is adjustable via potentiometers, allowing full utilization of the range of the 12-bit A-D card, providing $20*\log10(2^{12})=72$ dB of dynamic range. An experiment at 3.0 GHz showed detection of a target of RCS=42 m$^2$, at a 74.86 m range, using a transmit power of 14 dBm and total antenna gain of 16.2 dB. Via the below radar range equation, the calculated minimum detectable signal for the radar receiver of this example is −81.5 dBm or $7.13 \times 10^{-9}$ mW.

$$P_{MIN} = \frac{P_t \cdot G_{ANT} \cdot \lambda^2 \cdot RCS}{(4\pi)^3 R_{MAX}^4}$$

A target range-tracking experiment using a swept CW transmission (from 3.0-3.8 GHz) was performed to verify the receiver capability. The target tracked was the same target used above in the minimum detectable signal calculations.

A performance factor with the exemplary embodiment was the effect of temperature-dependent drift with the pre-amp op-amps. The base-line output of the correlators may fluctuate on the order of millivolts, dependent on ambient temperature fluctuations and air movement. This factor can be taken into account through the utilization of higher temperature-rated op-amps, the addition of a cooling fan, and using chips with only one op-amp per package (to reduce current to each chip). Also, a minimum amount of post-processing through pair-wise subtraction may be used to account for this performance factor.

An exemplary embodiment of a noise-radar of the present invention transmits wide-band, low power noise, and attempts to correlate the received signal with an exact copy of the transmitted signal. Random noise may have the property of zero time-domain autocorrelation at any offset, τ, other than t−τ=t. For this reason, it is an excellent choice for radar transmission. If a received noise signal correlates with the transmitted noise that was sent τ=Δt seconds ago, there may be no ambiguity in the fact that the total path for the transmitted signal from antenna to antenna was also Δt seconds. Using the speed of light constant $C=2.998 \times 10^8$ m/s allows derivation of the distance the signal traveled, which may generally be 2 times the distance from the antennas to the scattering target.

Since the use of true white noise (as defined above) may require physical delay lines for correlation (or complex and expensive digital storage systems) the use of a pseudo-random code may be preferred. If a known digital word with the same autocorrelation characteristics of noise is used for transmission, then a second identical word (with a time offset) may be fabricated for correlation purposes, with no need for delay elements. Since the word is finite, it may be repeated if the word transmission time is less than the time required to make a correlation measurement. The act of repeating the PRN waveform may introduce an ambiguous downrange phenomenon, since a non-zero correlation with the delayed waveform may indicate round-trip transmission time of Δt+nT, where T is the total word transmission-time. The unambiguous range can be calculated by:

$$R_u = \frac{c_o N}{2 f_{clk}}$$

where N is the total number of bits in the discrete PRN word, and f is the bits/second rate of PRN transmission.

Figure 7:
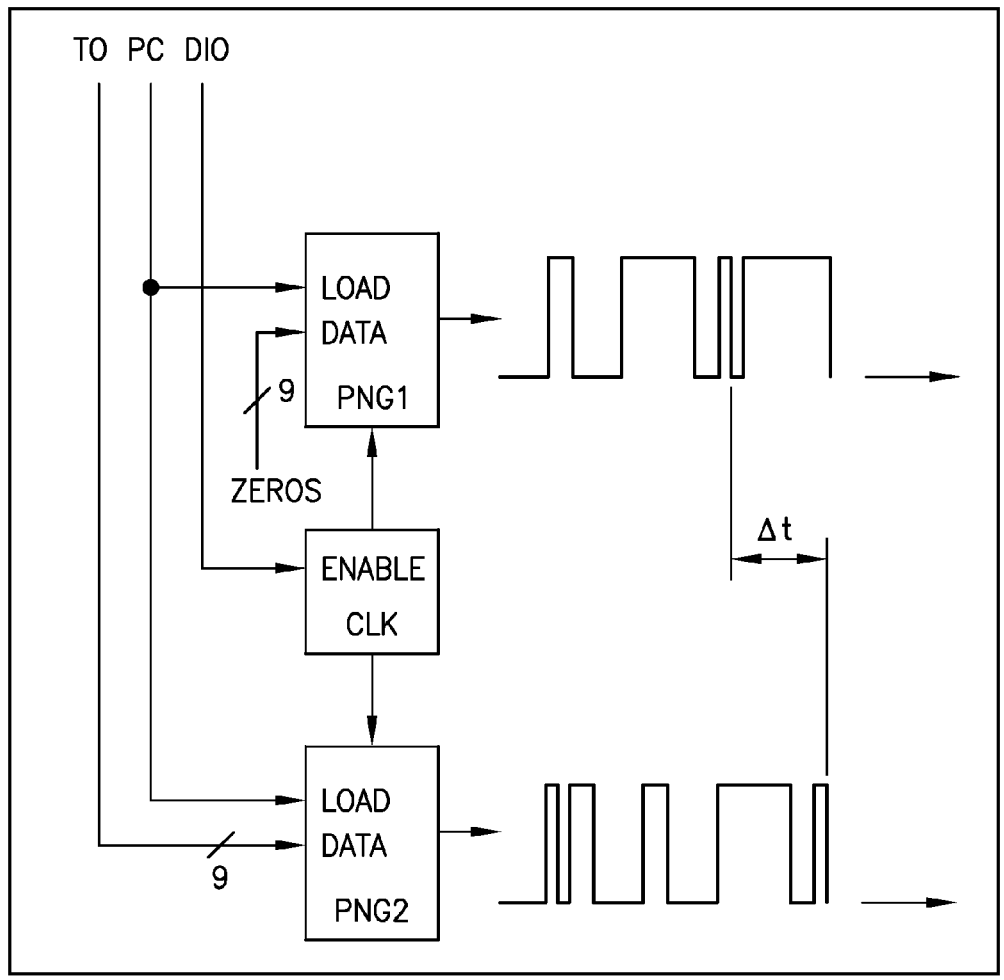
FIG. 7 is a block diagram of an exemplary embodiment of a PRN generator.
Figure 8:
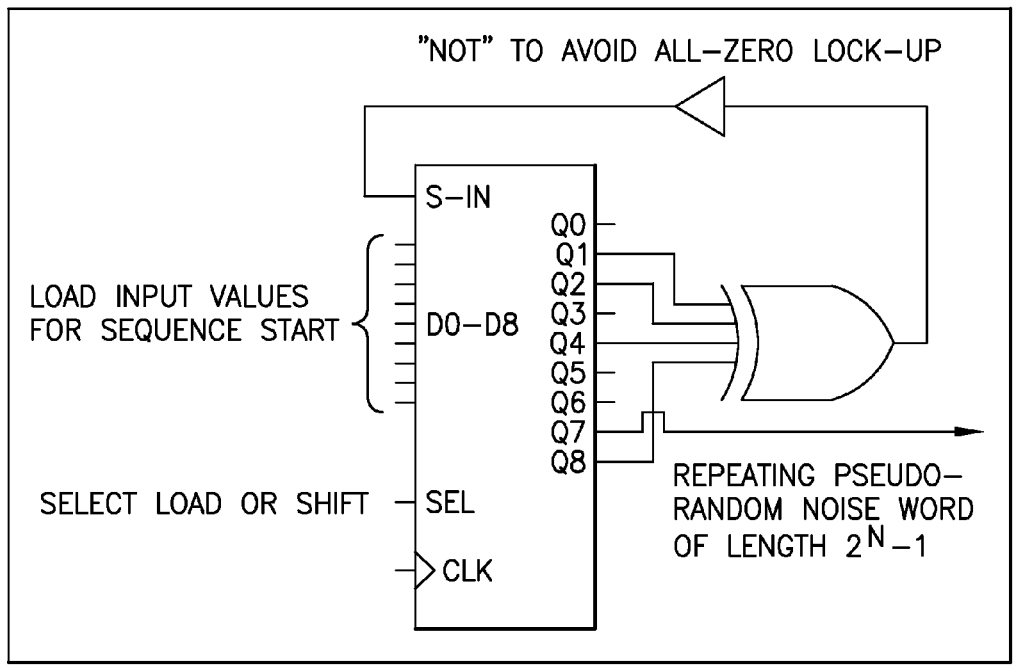
FIG. 8 is a schematic diagram of an exemplary embodiment of a Galois word generator.

An exemplary operational block diagram for a PRN generator is shown in FIG. 7. The exemplary nine-bit shift PRN generators are described in more detail below. In this configuration, the LOAD command resets one PRN generator, while it loads the other with values from the controller. When the clock is enabled, the top PRN generator starts streaming the digital noise word from the same place, while the lower one (depending on its loaded values) will start streaming at some positive time-offset. The effect is two identical PRN waveforms, with a known, settable time delay between them. The logic diagram of the PRN generators is shown in FIG. 8 as a basic Galois tapped shift-register configuration.

High speed ECL logic was used to implement the noise generator, while TLL-to-ECL translators were used to interface the design with the DIO card. In this example, the clock speed used was 760 MHz, and the total word length using 9-bit shift registers was $2^N-1=511$ bits. This provided an unambiguous range of 100.8 meters. The smallest possible difference in delay between the two waveforms was $1/f_{clk}=1.32$ ns, which produced a smallest available range-step of 7.75 inches.

From the output of the PRN module and on, these signals are no longer for these purposes to be considered "digital." Although they have square-wave properties, they can be manipulated in a substantially identical matter to any RF or analog signal. A precision voltage regulator was found to be useful since ECL logic requires very strict tolerances on DC power levels.

Overall, the PRN generator performed well. The output waveforms were well correlated. In addition, the delay between them was successfully set.

In this example, two methods were considered to convert the baseband square-wave noise signal into a transmittable signal in the chosen bandwidth of 3.0–3.8 GHz. The first method was high-order harmonic filtering and amplifying, and the second was basic AM modulation.

The largest spectral content of the square-wave noise of this example was located between DC and the clock frequency of 760 MHz. However, due to the fast logic rise and fall times on the order of 300 ps, there was significant spectral content around 1/300 ps=3.3 GHz. These harmonics can be bandpass filtered to 3.0–3.8 GHz, amplified, and transmitted directly without the need for any other modulation. This clock frequency was specifically chosen because it placed the high-order spectral nulls close to 3.0 and 3.8 GHz, while still utilizing most of the 800 MHz bandwidth.

Figure 9:
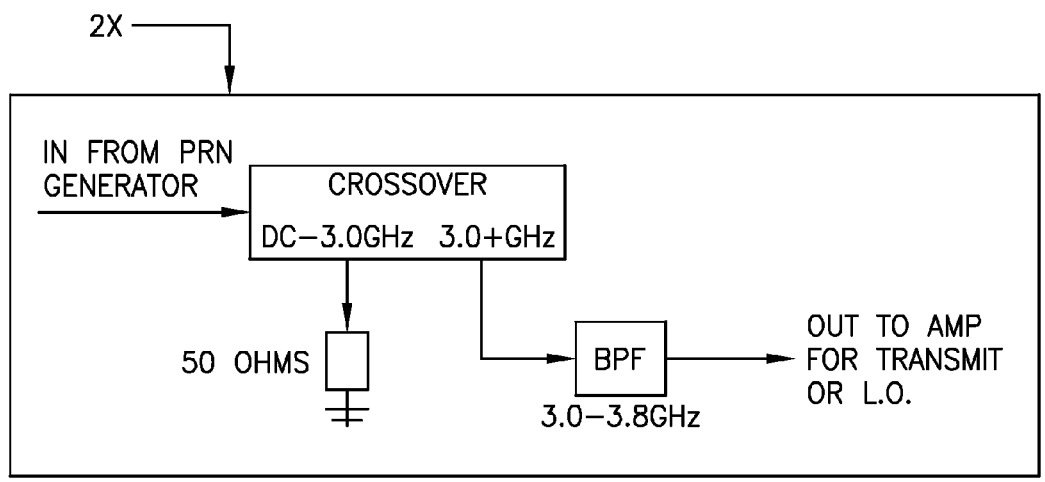
FIG. 9 is a block diagram of an exemplary embodiment of a diplexer module.

A standard bandpass filter may be completely reflective in the stopband. Since the ECL logic of the PRN generator may be sensitive to Electromagnetic Interference (EMI), the high-power reflections between DC and 3.0 GHz may degrade the performance of that module. The avoid this, a diplexer circuit was designed as shown in FIG. 9. Any spectral content below the passband of 3 GHz is shunted to a 50-ohm load to eliminate the high-power lower harmonics reflection.

The module was designed using microstrip techniques. The main components were a 5th-order Maximally-flat low-pass filter, a 5th order 0.5 dB Equi-ripple bandpass filter, and a 50-ohm resistor.

While there was noticeable variation between the simulated and measured responses, the actual results were better than −13 dB on the low-frequency S11, while the insertion loss in the passband was better than −2 dB. This provided a lower than 1.6 VSWR match up to around 2.5 GHz.

The power of the actual high-order harmonics after filtering was near about −70 dBm. Since the LO requirement of this example was +7 dBm, and transmission power was generally around +30 dBm, a system of low-noise high gain amplifiers was used to utilize the diplexer.

An AM Modulation Module was designed using standard analog up-conversion techniques. A Local Oscillator (LO) generated a CW tone centered in the band of transmission, at $f_0=3.4$ GHz. The two PRN signals were low-pass filtered, and used to modulated the LO waveforms, through two double-balanced mixers. As before, the two RF signals were then amplified and used for transmission and correlation as described.

Figure 10:
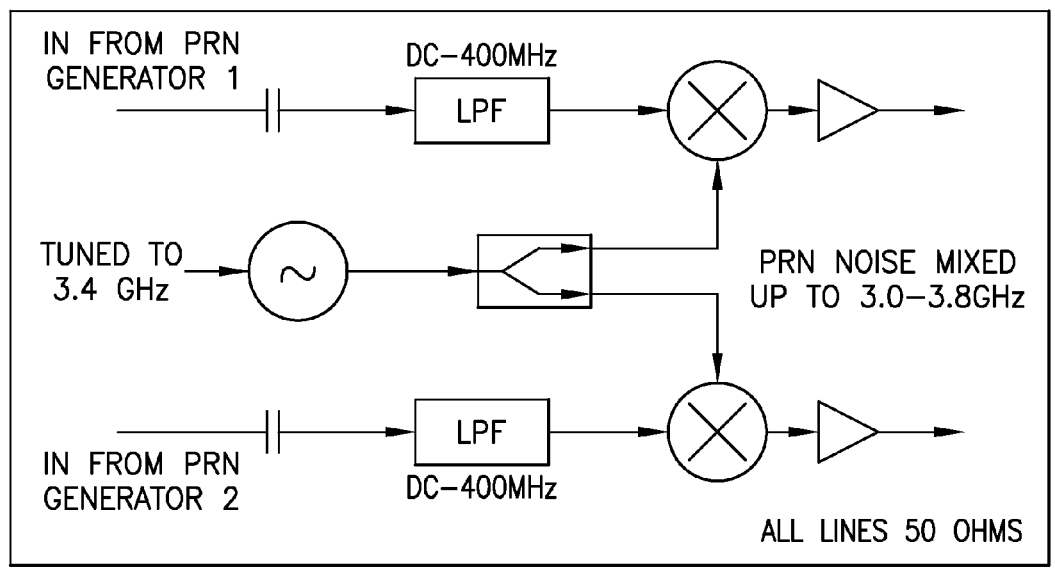
FIG. 10 is a block diagram of an exemplary embodiment of an upconverter.
Figure 11:
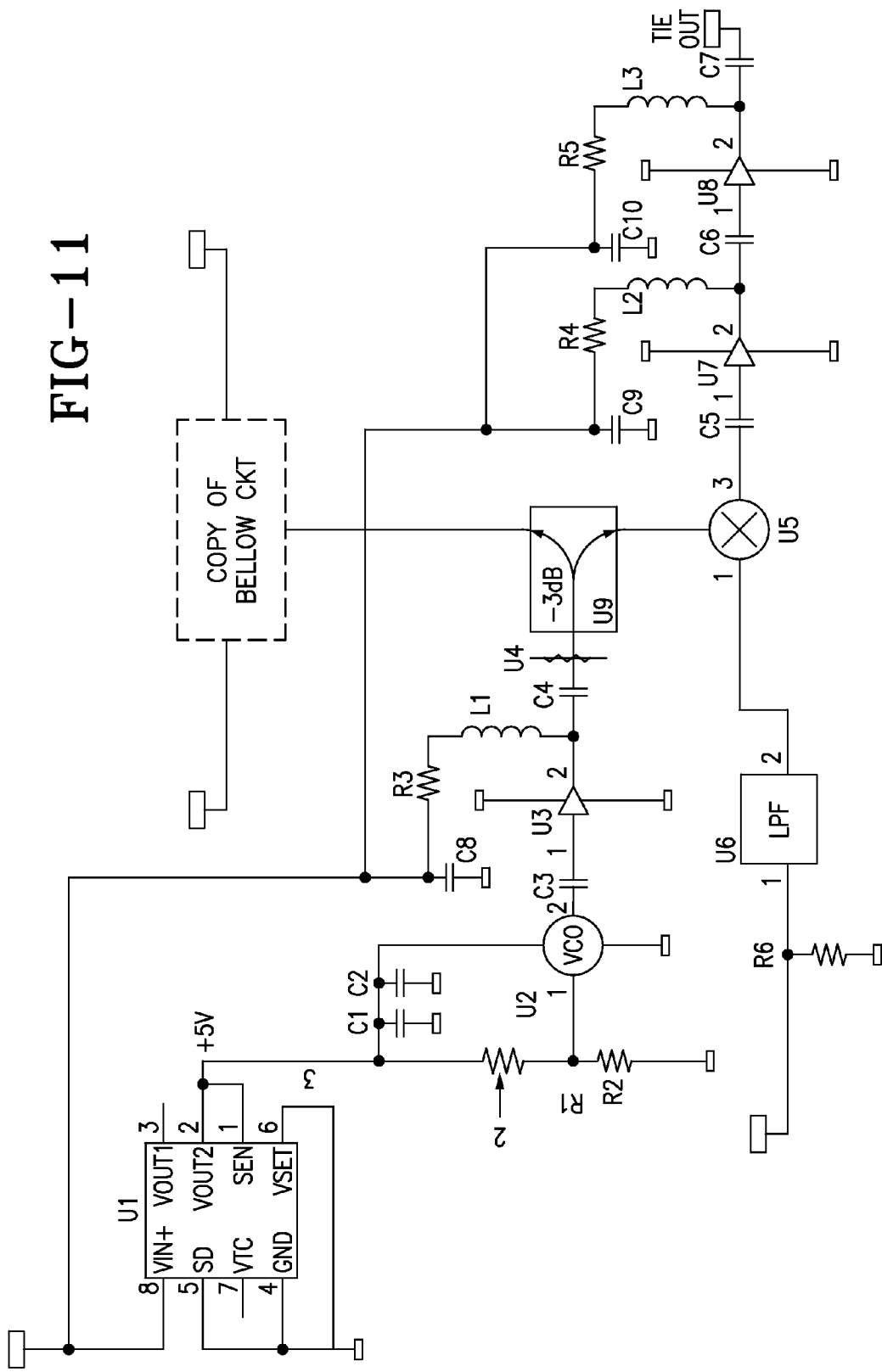
FIG. 11 is a circuit diagram of an exemplary PC board layout.

FIG. 10 is a block diagram of an exemplary embodiment of an upconverter. DC-block capacitors were used to eliminate the characteristic bias so as to suppress the large carrier in mixed output. A conventional lowpass filter limited the output RF signal to 800 MHz after modulation. A diplexer was not necessary in this application, since the high-power components were in the passband. With the proper setting of the LO to 3.4 GHz, the output transmission spectrum fell between 3.0 and 3.8 GHz. As the schematic of the final PC board layout and the actual circuit in FIG. 11 shows, a potentiometer-tuned VCO was used for the LO generation.

This embodiment of the board performed as expected. The total integrated power between 3.0 and 3.8 GHz was 10 dBm on both channels.

Antenna Array Design

Regarding the antenna array design, a static antenna array allowed 2-dimensional imaging at reduced complexity. This example of the antenna array provided one separate, isolated antenna element for each isolated receiver circuit. In this configuration, many antenna/receiver elements can span a large physical dimension, providing real-aperture coverage across potentially the entire front of a Humvee-sized vehicle.

There were four main design characteristics which lead to the final choice of the below described Vivaldi Tapered Slot Antenna (TSA) array. The array used wideband response from 3–4 GHz, a low-profile and low-drag form, appropriate antenna pattern, and minimized cost and complexity. For this example, the cost was especially important since up to forty antennas may be required to span the desired physical distance.

The Vivaldi TSA may be fabricated from a single sheet of RF laminate, and may have bandwidth potentials well over the required 1 GHz. In this embodiment, the average characteristic pattern of the antenna had a main E-plane beam of 50° and an H-plane beam near 35°. As supported by the preliminary testing, foliage penetration was particularly effective using horizontal polarization. For effective imaging, each antenna element may have a wide crossrange beam, but since the targets of interest may be on the ground, the vertical beam may be narrow so as to achieve maximum downrange gain. These pattern requirements, and the low complexity and profile of an RF laminate sheet design made the Vivaldi antenna a desirable choice.

Figure 12:
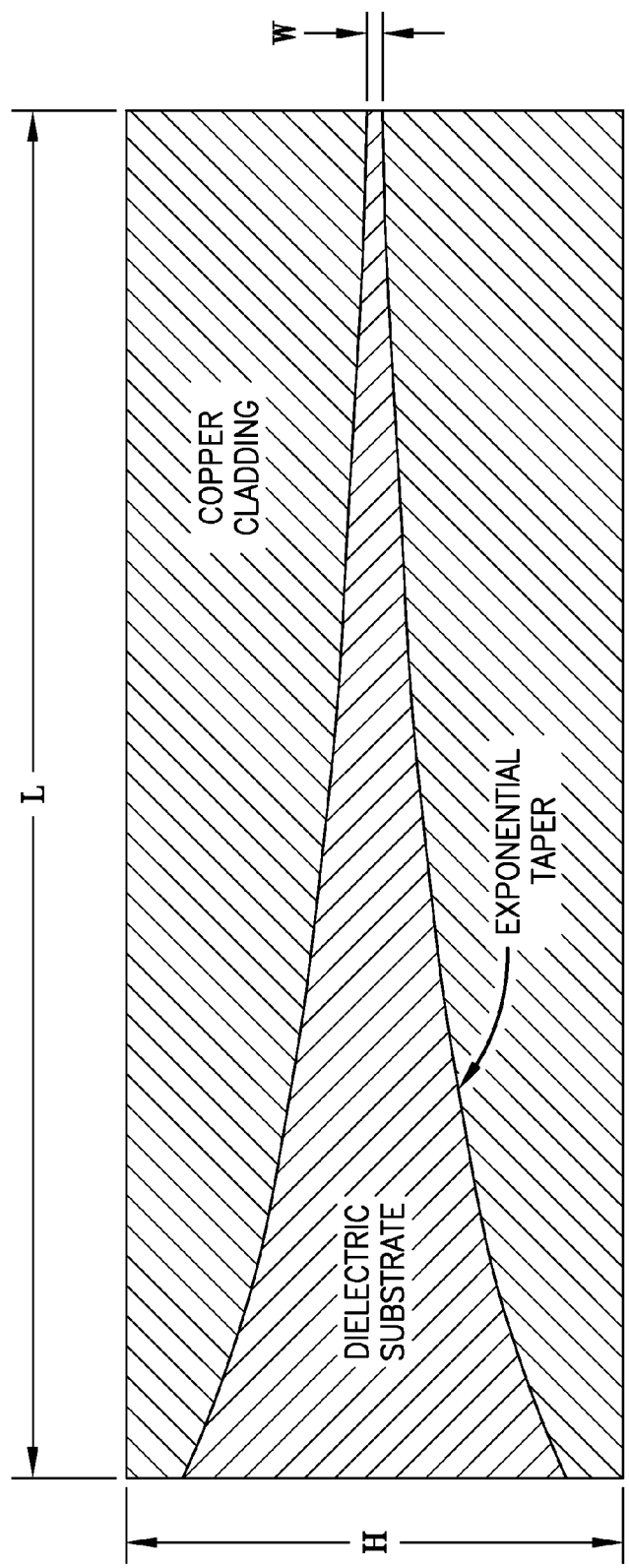
FIG. 12 is an outline of an exemplary Vivaldi TSA antenna horn section.

For this example, the minimum spacing between the individual antenna elements may be equal to or less than 2 inches to avoid spatial aliasing. This, in turn may limit the widest aperture (see FIG. 12) of each antenna element to 2 inches as well.

For proper matching to the 50-ohm receiver system, the horn of the antenna was tapered exponentially to a very small slot width, W. For this example, the smallest W may be was about 4 mils, due to fabrication constraints, which (with the relative dielectric constant of 2.33) created a characteristic impedance of about 80-ohms. The feed for the antenna utilized mutual coupling of a balanced Y-line microstrip/slot interface. The length with the proper taper and the required W and H yielded an L of approximately 12 inches. The measured gain of the antennas was approximately 8 dBi. H-plane 3 dB beamwidth was 40°, and the E-plane beamwidth was 50°.

An antenna isolation measurement was also been performed. Via network analyzer tests, first-adjacent antenna isolation was better than 20 dB. Second adjacent and third adjacent antennas had isolations of 30 dB and 40 dB respectively.

PC Interfacing and Software Design

One example of the PC interface and software design utilized a Pentium III Personal Computer (PC) as a controller. A PCI card used for this application was the Measurement Computing model PCI-DAS1001 12-bit A/D converter with onboard Digital Input/Output (DIO). National Instruments Labview 5.1 was used for interface programming, using Measurement Computing's Universal Library for Labview.

Two physical interfaces were used for operation. A DIO interface was used to control the PRN generator, and hence the transmission output, while four A/D channels monitored the output of each channel of the correlation receiver. Regarding digital interfacing, a 100-pin to 2×50-pin cable was used to translate two 50-pin output ribbon cables to the one 100-pin card input. A C100FF-2 cable was used for this purpose.

The receiver module had 4 SMA connectorized outputs, which were sampled by the 12-bit A/D portion of the PCI card. The input voltage range setting used was about −1.0–1.0V. The analog inputs used on the card were bipolar channels 0–3.

Figure 13:
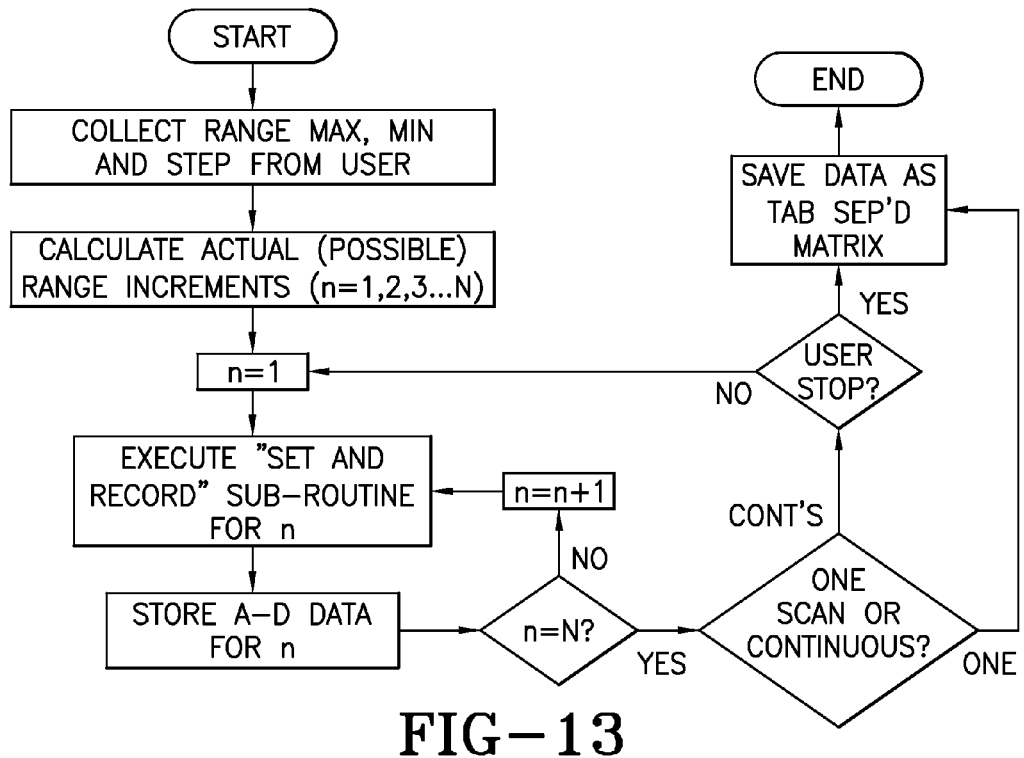
FIG. 13 is a block diagram of an exemplary embodiment of a data acquisition process.
Figure 14:
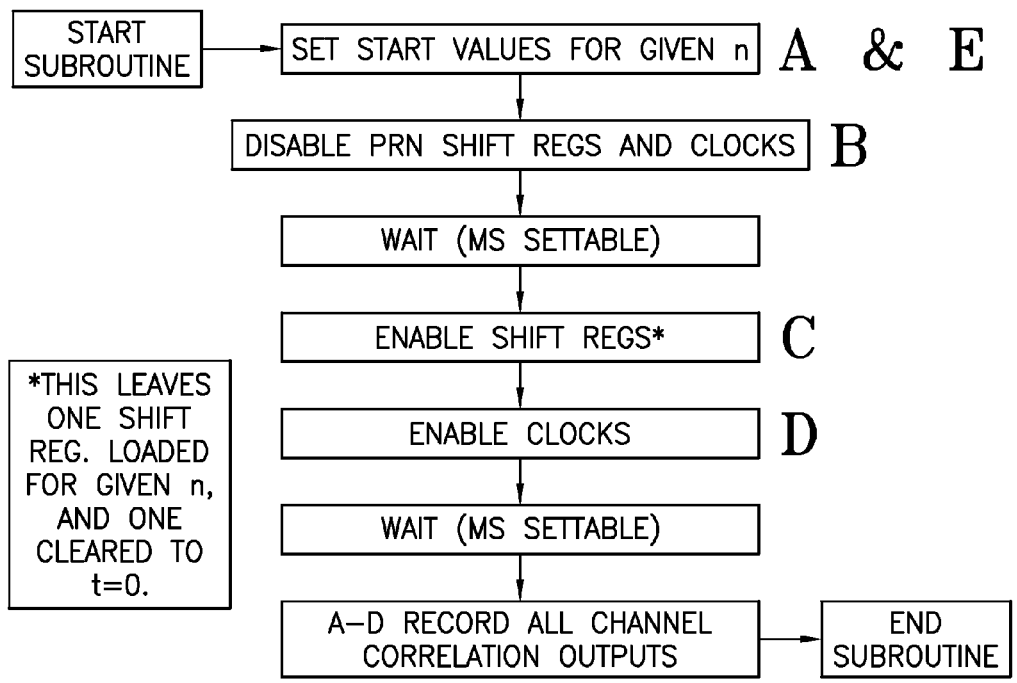
FIG. 14 is a flow diagram of an exemplary embodiment of a set and record subroutine for data acquisition hardware control.
Figure 15:
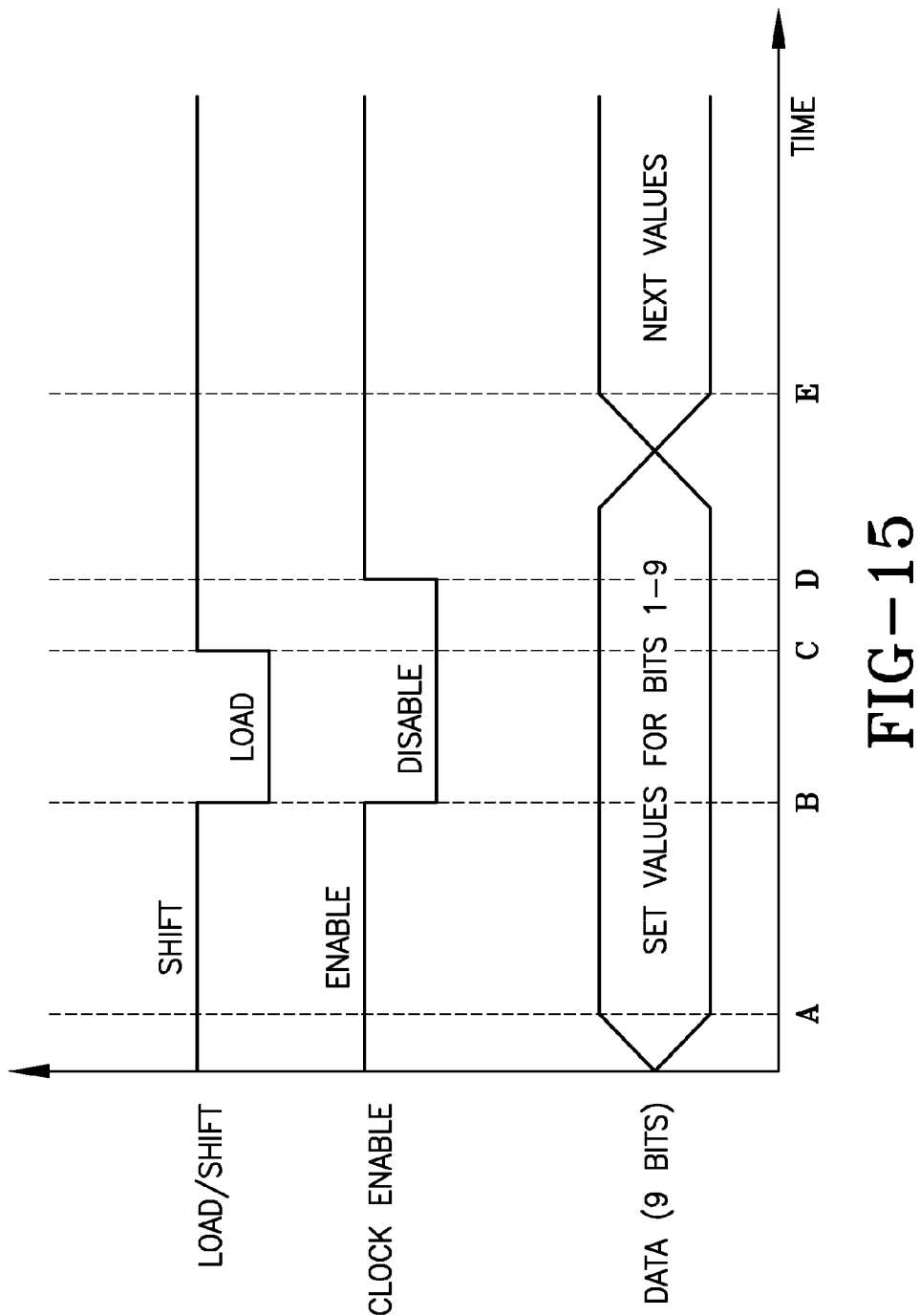
FIG. 15 is a timing diagram for an exemplary embodiment of a hardware control subroutine.

A block diagram of the data acquisition process is shown below in FIG. 13. The software used to implement the process was LabView. The main block of the program was the hardware-communication ("Set and Record" in FIG. 13) subroutine, which is found in FIG. 14 as a block diagram and FIG. 15 as a timing diagram. The timing diagram shows the actual TTL levels used to control the transmission of the noise code. Note that the time delays between B & C and C & D may only need to be a few clock cycles for certainty of data set.

Noise Radar System Testing and Evaluation

The radar system was tested as a system by performing a series of moving radar target tests. The first test was a set of runs where a sweeping microwave signal generator was used as the source. In this case, the parallel set of correlation channels for receive were tested. The radar was operated in the chirp mode, transmitting 20 mW power over the span from 3.0 to 3.8 GHz. Data collected as a function of time/frequency was processed by taking a Fourier transform over the frequency span. The result was a range profile. In this test, a person carrying a small (30 cm per side) corner reflector moved away at approximately 1 foot per second. The target could be tracked out to nearly 180 feet with this embodiment of the system. The receiver sensitivity was acceptable for our tracking application. A single range profile (impulse response) was obtained by taking an FFT of the detected signal as a function of frequency. Multiple scans were taken, and an earlier (no-target or "background") scan was subtracted from this scan to remove fixed clutter sources. A large peak at about 200 feet in the data corresponded to the person carrying the small corner reflector. Remember that there are four channels in this exemplary receiver operating in parallel. Data from the four channels may be used for azimuthal tracking of targets. A display set of four scans showed that all four channels detected the person with the small corner reflector at more than about 200 feet.

Next, the pseudorandom noise (pn) generator and the up-converter were activated as the signal source in our radar. No modification to the correlation receiver was needed. Our first test was to measure the response of a 50 foot long coaxial cable. The time shift was scanned over a span from 0 to 200 ns, and the correlation response of the cable was recorded. A plot of the cable response as measured by the pn radar was recorded. As expected, the impulse response peak occurred at about 75 ns plus the short cable used for the receive antenna. This test showed that the computer algorithm and interface used to set the time delay for the shift register time offset was working correctly. The time width of the response was approximately 2 ns, corresponding to an effective radar bandwidth of approximately 500 MHz.

A detail of the response of the pn radar system for a single range gate at 70 feet was graphed. A person carrying a large (1 m) corner reflector walked through the set range at approximately 3 feet per second (fps). As a result of this test, the inventors discovered that signal processing in the final detection and processing algorithm may be used to account for a phase interference pattern as a target moves in relation to the radar.

The inventors also proved that the radar may detect obstacles to a moving vehicle. For example, a small set of "triggers" may be set up as various ranges and quickly scanned. The scattering response of a moving target through 4 range gates was tracked. In this case, a person carrying a small corner reflector walked inward toward the radar from beyond 150 feet. Each time the person passed through a detection zone, there was a strong response. This permitted the software to detect and track all of the obstacles ahead of a moving vehicle. In addition, there may be a large number of antennas so that azimuthal tracking may be included. The increase in the number of antennas may not be a time problem, because each antenna may have an independent correlation receiver operating in parallel with all the others.

If the radar system detects a target where more information is needed, then the range gates can be adaptively adjusted by the software to focus on the particular target of interest. In this example, four range gates were set to cover the zone from 98 to 103 feet from the radar. A target moved away and then toward the radar during this observation time. Clear moving target responses were seen in the data.

Conclusions

The test results demonstrated that the pseudo-noise radar system may be used to alert a moving or stationary vehicle to the presence of dangerous obstacles. The radar may operate in a frequency band where penetration of light (grass and brush) foliage is possible. Thus, the radar may see through fog, rain, snow, darkness, light foliage, and even building walls. Since the radar may use a very wide band (e.g., greater than 800 MHz) spread spectrum signal, it may be very difficult to detect and to jam. Furthermore, noise-like signals may be transmitted over bands that are otherwise licensed to other carriers because it has been shown that they do not interfere with those carriers.

The radar system and individual components of the present invention have been demonstrated herein. In particular, the present invention includes, but is not limited to, a new design for an ultrawide band array antenna and an analog parallel processing receiver system that permits flexible software control of the system. The radar system may include a display and/or control system.

The radar system may be installed on a vehicle and used with autonomous obstacle avoidance software. The radar may detect targets including, but not limited to, people and vehicles moving in relation to the test vehicle (or vice versa) even through light foliage. The radar may also be used to detect targets through other types of clutter such as building walls. An exemplary embodiment of the radar system may range-triangulate on targets. Thus, rather than a large antenna system, one exemplary system may include only 2 or 4 such antennas and obtain high resolution range data from each sensor. Range triangulation may provide individual target tracking. Ambiguities may be overcome by tracking each target as the vehicle moves and by cross correlation of high resolution range profiles from the individual sensors. Different targets may have different high resolution range profiles.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A radar system comprising:
   at least one first waveform and at least one second waveform stored together on a memory device;
   an antenna in connection with said memory device with means for transmitting the at least one first waveform and means for receiving a waveform that is derived from said first waveform interacting with a target; and
   a mixer adapted to mix the received waveform with said second waveform.

2. The radar system of claim 1 wherein said memory device is a sequential memory device.

3. The radar system of claim 2 wherein said memory device is a first-in/first-out circuit (FIFO).

4. The radar system of claim 1 wherein said first waveform has a bandwidth greater than about 100 MHz.

5. The radar system of claim 1 wherein said first waveform has a bandwidth greater than about 300 MHz.

6. The radar system of claim wherein said first waveform has a bandwidth greater than about 500 MHz.

7. The radar system of claim 1 wherein said first waveform has a bandwidth greater than about 800 MHz.

8. The radar system of claim 1 wherein a divider circuit is adapted to provide said received waveform that is derived from said first waveform interacting with the target.

9. The radar system of claim 1 wherein said memory device is adapted to provide at least one additional output, said radar system further comprising:
   at least one additional mixer such that each additional mixer is adapted to mix a respective additional output of said memory device with a respective received waveform that is derived from said first waveform interacting with the target.

10. The radar system of claim 9 wherein a divider circuit is adapted to provide said received waveforms that are derived from said first waveform interacting with the target.

11. A radar system comprising:
    a memory device adapted to provide multiple outputs such that a first waveform is produced from at least one of said outputs and a second waveform is produced from at least one of said outputs; and
    a mixer adapted to mix said second waveform with a received waveform that is derived from said first waveform interacting with a target.

12. The radar system of claim 11 wherein said first waveform is equivalent to one of said outputs of said memory device.

13. The radar system of claim 11 wherein said first waveform is produced from a plurality of said outputs of said memory device.

14. The radar system of claim 13 wherein a digital-to-analog (D/A) converter is adapted to provide said first waveform.

15. The radar system of claim 11 wherein said second waveform is equivalent to one of said outputs of said memory device.

16. The radar system of claim 11 wherein said second waveform is produced from a plurality of said outputs of said memory device.

17. The radar system of claim 16 wherein a digital-to-analog (D/A) converter is adapted to provide said second waveform.

18. The radar system of claim 11 wherein:
    said first waveform is produced from a plurality of said outputs of said memory device; and
    said second waveform is produced from a plurality of said outputs of said memory device.

19. The radar system of claim 11 wherein said memory device is a sequential memory device.

20. The radar system of claim 19 wherein said memory device is a first-in/first-out circuit (FIFO).

21. The radar system of claim 11 wherein said first waveform has a bandwidth greater than about 100 MHz.

22. The radar system of claim wherein said first waveform has a bandwidth greater than about 300 MHz.

23. The radar system of claim 11 wherein said first waveform has a bandwidth greater than about 500 MHz.

24. The radar system of claim 11 wherein said first waveform has a bandwidth greater than about 800 MHz.

25. The radar system of claim 11 wherein a divider circuit is adapted to provide said received waveform that is derived from said first waveform interacting with the target.

26. The radar system of claim 11 wherein at least one additional waveform is adapted to be produced from at least one of said outputs of said memory device, said radar system further comprising:

at least one additional mixer such that each additional mixer is adapted to mix a respective additional waveform that is produced from at least one of said outputs of said memory device with a respective received waveform that is derived from said first waveform interacting with the target.

27. The radar system of claim 26 wherein a divider circuit is adapted to provide said received waveforms that are derived from said first waveform interacting with the target.

28. A radar system adapted to transmit a first waveform, said radar system comprising:
   a memory device adapted to provide a second waveform; and
   a mixer adapted to mix said second waveform with a received waveform that is derived from said first waveform interacting with a target.

29. The radar system of claim 28 wherein a divider circuit is adapted to provide said received waveform that is derived from said first waveform interacting with the target.

30. The radar system of claim 28 wherein said memory device is adapted to provide at least one additional waveform, said radar system further comprising:
   at least one additional mixer such that each additional mixer is adapted to mix a respective additional waveform of said memory device with a respective received waveform that is derived from said first waveform interacting with the target.

31. The radar system of claim 30 wherein a divider circuit is adapted to provide said received waveforms that are derived from said first waveform interacting with the target.

32. A radar system adapted to transmit a first waveform, said radar system comprising:
   a memory device adapted to provide multiple outputs such that a second waveform is produced from said outputs; and
   a mixer adapted to mix said second waveform with a received waveform that is derived from said first waveform interacting with a target.

33. The radar system of claim 32 wherein a divider circuit is adapted to provide said received waveform that is derived from said first waveform interacting with the target.

34. The radar system of claim 32 wherein said memory device is adapted to provide additional outputs such that at least one additional waveform is produced from said additional outputs said radar system further comprising:
   at least one additional mixer such that each additional mixer is adapted to mix a respective additional waveform that is produced from said additional outputs of said memory device with a respective received waveform that is derived from said first waveform interacting with the target.

35. The radar system of claim 34 wherein a divider circuit is adapted to provide said received waveforms that are derived from said first waveform interacting with the target.

* * * * *

UNITED STATES PATENT AND TRADEMARK OFFICE
CERTIFICATE OF CORRECTION

PATENT NO. : 7,196,657 B2  
APPLICATION NO. : 11/076424  
DATED : March 27, 2007  
INVENTOR(S) : Walton Page 1 of 1

It is certified that error appears in the above-identified patent and that said Letters Patent is hereby corrected as shown below:

On the title page
In section (56), References Cited, U.S. PATENT DOCUMENTS, please delete "6,864,834 B2 * 3/2004 Walton 342/195" and insert -- 6,864,834 B2 * 3/2005 Walton 342/195 --.

In column 14, lines 26-28 please delete " $P_{MIN} = \dfrac{P_t \cdot G_{ANT} \cdot \lambda^2 \cdot RCS}{(4\pi)^3 R^4{}_{MAX}}$ " and insert -- $P_{MIN} = \dfrac{P_t \cdot G_{ANT} \cdot \lambda^2 \cdot RCS}{(4\pi)^3 R_{MAX}{}^4}$ --.

In column 19, line 66, please delete "The radar system of claim wherein" and insert -- The radar system of claim 1 wherein --.

In column 20, line 55, please delete "The radar system of claim wherein" and insert -- The radar system of claim 11 wherein --.

In column 22, line 17, please delete "outputs said" and insert -- outputs, said --.

Signed and Sealed this

Twelfth Day of June, 2007

JON W. DUDAS  
*Director of the United States Patent and Trademark Office*